United States Patent
Amuru et al.

(10) Patent No.: US 11,197,231 B2
(45) Date of Patent: Dec. 7, 2021

(54) METHOD AND SYSTEM FOR HANDLING RADIO LINK MONITORING (RLM) USING BANDWIDTH PART (BWP) CONFIGURATIONS

(71) Applicant: Samsung Electronics Co., Ltd., Suwon-si (KR)

(72) Inventors: Saidhiraj Amuru, Bangalore (IN); Yongok Kim, Seoul (KR); Anshuman Nigam, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 151 days.

(21) Appl. No.: 16/645,434

(22) PCT Filed: Sep. 7, 2018

(86) PCT No.: PCT/KR2018/010483
§ 371 (c)(1),
(2) Date: Mar. 6, 2020

(87) PCT Pub. No.: WO2019/050323
PCT Pub. Date: Mar. 14, 2019

(65) Prior Publication Data
US 2020/0296656 A1    Sep. 17, 2020

(30) Foreign Application Priority Data

Sep. 8, 2017  (IN) .............................. 201741031876
Sep. 29, 2017 (IN) .............................. 201741034763
Aug. 17, 2018 (IN) .............................. 201741031876

(51) Int. Cl.
*H04W 48/08*     (2009.01)
*H04L 1/18*      (2006.01)
(Continued)

(52) U.S. Cl.
CPC .......... *H04W 48/08* (2013.01); *H04L 1/1816* (2013.01); *H04L 1/1896* (2013.01); *H04L 5/001* (2013.01); *H04L 5/0048* (2013.01); *H04L 5/0098* (2013.01); *H04W 72/042* (2013.01); *H04W 72/1268* (2013.01); *H04W 76/27* (2018.02); *H04L 5/0094* (2013.01)

(58) Field of Classification Search
None
See application file for complete search history.

(56) References Cited

U.S. PATENT DOCUMENTS

2012/0106499 A1    5/2012  Seo et al.
2014/0254452 A1    9/2014  Von Elbwart et al.
(Continued)

FOREIGN PATENT DOCUMENTS

EP       2950472 A1      12/2015
WO    WO-2018128427 A1 *  7/2018  ............ H04W 48/12

OTHER PUBLICATIONS

MediaTek Inc., R1-1713978, Further Details on Bandwidth Part Operation in NR, 3GPP TSG RAN WG1 #90, 3GPP (Aug. 12, 2017) See p. 3, 4, etc. (Year: 2017).*

(Continued)

*Primary Examiner* — Kenny S Lin

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. In accordance with an aspect of the present disclosure, an embodiment of the present invention provides a method of a base station in a wireless communication (Continued)

system, the method comprising: transmitting, to a user equipment (UE), a master information block (MIB) including initial downlink bandwidth part (BWP) configuration information; and transmitting, to the UE, Remaining Minimum System Information (RMSI) including initial uplink bandwidth part (BWP) configuration information, wherein the RMSI is transmitted based on the initial downlink bandwidth part (BWP) configuration information.

11 Claims, 31 Drawing Sheets

(51) Int. Cl.
*H04W 76/27* (2018.01)
*H04L 5/00* (2006.01)
*H04W 72/04* (2009.01)
*H04W 72/12* (2009.01)

(56) References Cited

U.S. PATENT DOCUMENTS

| | | | |
|---|---|---|---|
| 2015/0245378 A1 | 8/2015 | Kim et al. | |
| 2015/0341914 A1 | 11/2015 | Lee et al. | |
| 2017/0041112 A1* | 2/2017 | Kim | H04W 24/08 |
| 2018/0270799 A1* | 9/2018 | Noh | H04L 1/1812 |
| 2019/0356446 A1* | 11/2019 | Kim | H04W 72/0453 |
| 2020/0021410 A1* | 1/2020 | Choi | H04L 5/0051 |
| 2020/0037260 A1* | 1/2020 | Fu | H04L 27/2646 |
| 2020/0154377 A1* | 5/2020 | Qian | H04L 5/0048 |
| 2020/0213066 A1* | 7/2020 | Ma | H04W 72/04 |
| 2020/0221428 A1* | 7/2020 | Moon | H04B 7/024 |
| 2020/0304356 A1* | 9/2020 | Xue | H04L 27/2666 |
| 2020/0344034 A1* | 10/2020 | Moon | H04L 5/0094 |
| 2021/0037505 A1* | 2/2021 | Kim | H04W 72/04 |

OTHER PUBLICATIONS

MediaTek et al., R1-1715167, Way Forward on Bandwidth Part Operation, 3GPP TSG RAN WG1 #90, 3GPP (Aug. 26, 2017) See p. 2. (Year: 2017).*

Ericsson, R1-1712953, On bandwidth parts, 3GPP TSG RAN WG1 #90, 3GPP (Aug. 10, 2017) See whole document. (Year: 2017).*
Huawei et al., R1-1712153, Overview of bandwidth part, 3GPP TSG RAN WG1 #90, 3GPP (Aug. 12, 2017) See whole document. (Year: 2017).*
European Patent Office, "Communication pursuant to Article 94(3) EPC", dated May 11, 2021, in connection with European Patent Application No. 18854154.4, 6 pages.
Intellectual Property India, "Examination report under sections 12 & 13 of the Patents Act" dated Mar. 10, 2021, in connection with Indian Patent Application No. 201741031876, 5 pages.
AT&T, "Remaining details of bandwidth parts", 3GPP TSG RAN WG1 Meeting #90, R1-1712728, Prague, Czech Republic, Aug. 21-25, 2017, 4 pages.
LG Electronics, "Further remaining details on wider bandwidth operation", 3GPP TSG RAN WG1 Meeting #90, R1-1713204, Prague, Czech Republic Aug. 21-25, 2017, 7 pages.
ISA/KR, International Search Report and Written Opinion of the International Searching Authority, International Application No. PCT/KR2018/010483, dated Dec. 17, 2018, 8 pages.
3GPP TS 38.331 V0.0.5 (Aug. 2017), Technical Specification, 3rd Generation Partnership Project; Technical Specification Group Radio Access Network; NR; Radio Resource Control (RRC); Protocol specification (Release 15 ), Aug. 2017, 76 pages.
LG Electronics, et al., "WF on Bandwidth Part for DL common channel," R1-1715075, 3GPP TSG RAN WG1 Meeting RAN1 #90, Prague, Czech Republic, Aug. 21-25, 2017, Agenda item: 6.1.1.2.3, 5 pages.
MediaTek, et al., "Way Forward on Further Details for Bandwidth Part," R1-1711802, 3GPP TSG-RAN WG1 NR Ad-Hoc Meeting, Qingdao, China, Jun. 27-30, 2017, Agenda item 5.1.7, 2 pages.
Supplementary European Search Report in connection with European Application No. 18854154.4 dated Jul. 22, 2020, 13 pages.
MediaTek Inc., "Further Details on Bandwidth Part Operation in NR," R1-17013978, 3GPP TSG RAN WG1 Meeting #90, Prague, Czech Republic, Aug. 21-25, 2017, 10 pages.
MediaTek Inc., et al., "Way Forward on Bandwidth Part Operation," R1-1715167, 3GPP TSG-RAN WG1 Meeting #90, Prague, Czech Republic, Aug. 21-25, 2017, 2 pages.
Vivo, "Discussion on the activation/deactivation of the bandwidth part," R1-1712870, 3GPP TSG RAN WG1 Meeting #90, Prague, Czech Republic, Aug. 21-25, 2017, 3 pages.

* cited by examiner

FIG. 6

| C8 | C7 | C6 | C5 | C4 | C3 | C2 | C1 | C0 | R |

FIG. 20A

| | S S B 1 | Wideband CC with multiple SSB | S S B 2 | |

METHOD AND SYSTEM FOR HANDLING RADIO LINK MONITORING (RLM) USING BANDWIDTH PART (BWP) CONFIGURATIONS

CROSS-REFERENCE TO RELATED APPLICATIONS

This application is a 371 National Stage of International Application No. PCT/KR2018/010483, filed Sep. 7, 2018, which claims priority to Indian Patent Application No. 201741031876, filed Sep. 8, 2017, Indian Patent Application No. 201741034763, filed Sep. 29, 2017, and Indian Patent Application No. 201741031876, filed Aug. 17, 2018, the disclosures of which are herein incorporated by reference in their entirety.

BACKGROUND

1. Field

The embodiment herein relates to a wireless communication system, and more particularly relates to a method and system for handling a Radio Link Monitoring (RLM) using Bandwidth Part (BWP) configurations in the wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Generally, mobile communication systems have been developed for providing a high quality mobile communication services to a user. With the dramatic development of communication technologies, the mobile communication systems are now capable of providing high-speed data communication services as well as voice communication services. A Long Term Evolution (LTE) is a technology for implementing a packet-based communication at a higher data rate of a maximum of about 100 Mbps. In order to meet the demand for an increased wireless data traffic, since deployment of 4th generation (4G) communication systems, efforts have been made to develop an improved 5th generation (5G) communication systems or an LTE-Advanced communication system. Therefore, the 5G or LTE-Advanced communication system is also called a 'beyond 4G network' or a 'post LTE system'. The 4G communication systems operate in sub-6 GHz spectrum bands, where all transmissions and receptions take place in an Omni-directional manner.

In order to achieve a high data transmission rate, the 5G communication system is considered to be implemented in a millimeter wave (mm Wave) or extremely higher frequency bands as well, for e.g., 28 GHz, 60 GHz, etc., so as to accomplish higher data rates. In such instances, a User Equipment (UE) of the 5G system must support bandwidth on the order of 1 GHz in a single carrier. In other words, without using carrier aggregation, the user of the 5G must support bandwidths of this order. Several challenges arise in this regard as the user of the UE must support wide bandwidth such as Radio Frequency (RF), power consumption, scheduling etc. As the user of the UE need not always require such wide bandwidth, there exists a concept of 1st RF and 2nd RF bandwidth in the wide bandwidth. However, the goal is to avoid the user of the UE from monitoring wide bandwidth all the time as it is not power efficient.

Thus, it is desired to address the above mentioned disadvantages or other shortcomings or at least provide a useful alternative.

SUMMARY

In order to achieve a high data transmission rate, the 5G communication system is considered to be implemented in a millimeter wave (mm Wave) or extremely higher frequency bands as well, for e.g., 28 GHz, 60 GHz, etc., so as to accomplish higher data rates. In such instances, a User Equipment (UE) of the 5G system must support bandwidth on the order of 1 GHz in a single carrier. In other words, without using carrier aggregation, the user of the 5G must support bandwidths of this order. Several challenges arise in this regard as the user of the UE must support wide bandwidth such as Radio Frequency (RF), power consumption, scheduling etc. As the user of the UE need not always require such wide bandwidth, there exists a concept of 1st RF and 2nd RF bandwidth in the wide bandwidth. However, the goal is to avoid the user of the UE from monitoring wide bandwidth all the time as it is not power efficient.

Thus, it is desired to address the above mentioned disadvantages or other shortcomings or at least provide a useful alternative.

The objective of the present invention is to solve at least one of the above technical deficiencies, particularly the data forwarding problem during the movement of a UE between an LTE system and a 5G system.

In accordance with an aspect of the present disclosure, an embodiment of the present invention provides a method of a base station in a wireless communication system, the method comprising: transmitting, to a user equipment (UE), a master information block (MIB) including initial downlink bandwidth part (BWP) configuration information; and transmitting, to the UE, Remaining Minimum System Information (RMSI) including initial uplink bandwidth part (BWP) configuration information, wherein the RMSI is transmitted based on the initial downlink bandwidth part (BWP) configuration information.

In accordance with another aspect of the present disclosure, another embodiment of the present invention provides a method of a user equipment (UE) in a wireless communication system, the method comprising: receiving, from a base station, a master information block (MIB) including initial downlink bandwidth part (BWP) configuration information; and receiving, from the base station, Remaining Minimum System Information (RMSI) including initial uplink bandwidth part (BWP) configuration information, wherein the RMSI is received based on the initial downlink bandwidth part (BWP) configuration information.

In accordance with another aspect of the present disclosure, another embodiment of the present invention provides a base station in a wireless communication system, the base station comprising: a transceiver; and a processor operably connected to the transceiver, the processor configured to: transmit, to a user equipment (UE), a master information block (MIB) including initial downlink bandwidth part (BWP) configuration information; and transmit, to the UE, Remaining Minimum System Information (RMSI) including initial uplink bandwidth part (BWP) configuration information, wherein the RMSI is transmitted based on the initial downlink bandwidth part (BWP) configuration information.

In accordance with another aspect of the present disclosure, another embodiment of the present invention provides a user equipment (UE) in a wireless communication system, the UE comprising: a transceiver; and a processor operably connected to the transceiver, the processor configured to: receive, from a base station, a master information block (MIB) including initial downlink bandwidth part (BWP) configuration information; and receive, from the base station, a Remaining Minimum System Information (RMSI) including initial uplink bandwidth part (BWP) configuration information, wherein the RMSI is received based on the initial downlink bandwidth part (BWP) configuration information.

Additional aspects and advantages of the present invention will be partially appreciated and become apparent from the descriptions below, or will be well learned from the practices of the present invention.

The principal object of the embodiments herein is to provide a method and system for handling a Radio Link Monitoring (RLM) using Bandwidth Part (BWP) configurations in the wireless communication system.

Another object of the embodiments herein is to detect an active BWP based on the BWP configurations from the base station.

Another object of the embodiments herein is to perform the RLM on the active BWP using the BWP configurations.

Another object of the embodiments herein is to detect that the active BWP is deactivated from the base station based on the BWP configuration.

Another object of the embodiments herein is to perform a retransmission on a configured active BWP from the plurality of BWPs by recombining a data associated with the deactivated BWP and the configured active BWP using a Hybrid Automatic Repeat Request (HARM) buffer.

Another object of the embodiments herein is to report an in-sync measurement for each BWP to the base station.

Another object of the embodiments herein is to report an out-sync measurement for each BWP to the base station.

BRIEF DESCRIPTION OF THE DRAWINGS

The embodiments herein will be better understood from the following detailed description with reference to the drawings, in which:

FIG. 6 illustrates an activation/deactivation of a MAC control element, according to an embodiment as disclosed herein;

FIGS. 20A-20D are schematic diagrams illustrating a method for performing a Random Access channel (RACH) procedure using an initial active BWP configuration considering multiple SSBs, according to an embodiment as disclosed herein.

DETAILED DESCRIPTION

Figure 1:
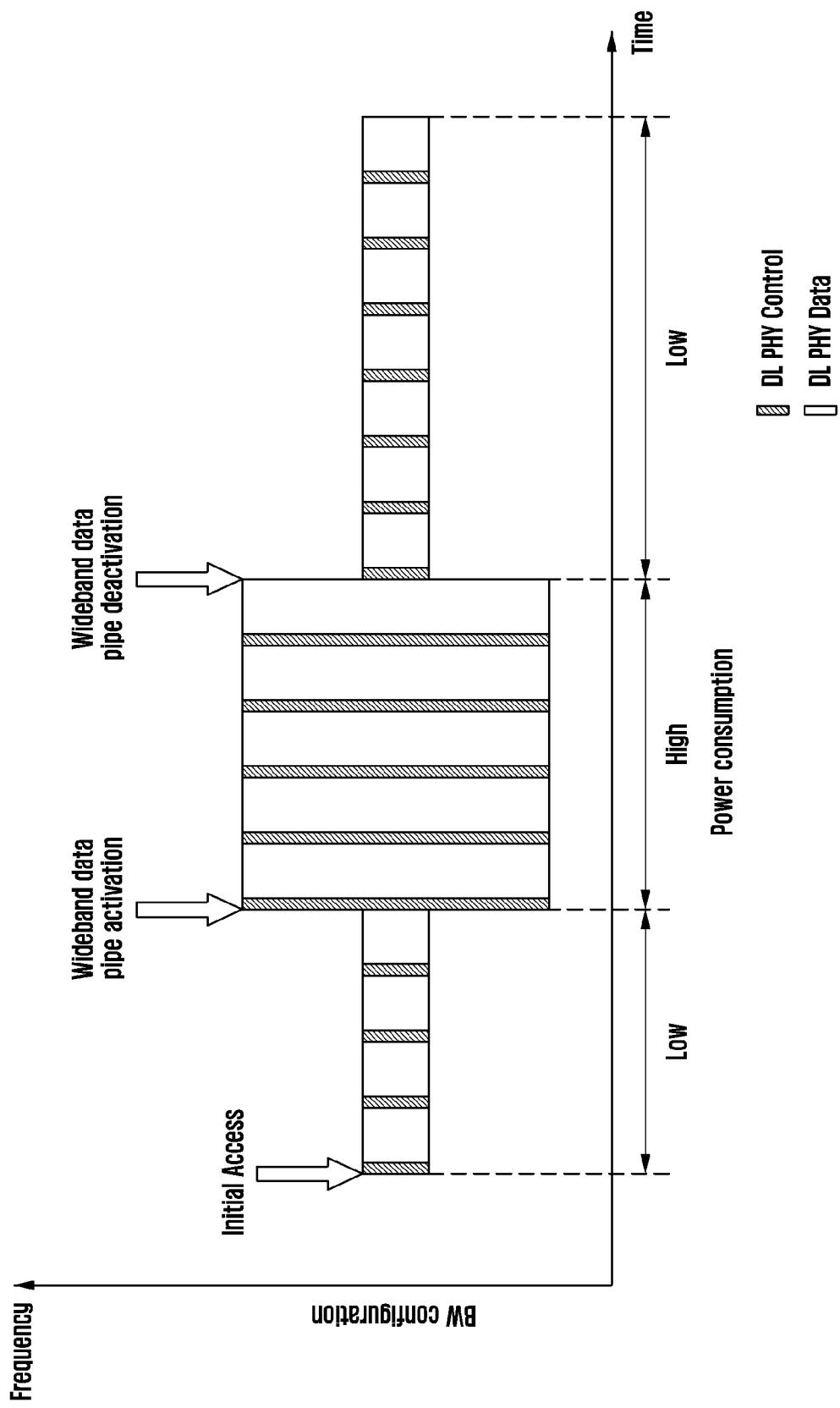
FIG. 1 is a schematic diagram illustrating a BWP configuration for a wideband operations in a wireless communication system, according to a prior art.

Accordingly the embodiments herein provide a method and system for handling a RLM using BWP configurations in the wireless communication system. The method includes receiving, by a User Equipment (UE), the BWP configurations for each BWPs in a plurality of BWPs of a total bandwidth from a base station using one of a MAC Control Element (MAC-CE), a Radio Resource Control (RRC) message, and a Downlink Control Indicator (DCI), wherein the BWP configurations comprising one of a single active BWP and multiple active BWP in the plurality of BWPs. Further, the method includes detecting, by the UE, an active BWP based on the BWP configurations from the base station, wherein at least one of the active BWP and a deactivated BWP in the plurality of BWPs are indicated using one of the MAC CE and the DCI in the RRC message. Further, the method includes performing, by the UE, the RLM on the active BWP using the BWP configurations.

In an embodiment, performing the RLM on the active BWP using the BWP configurations includes detecting, by the UE, that the active BWP is deactivated from the base station based on the BWP configuration. Further, the method includes performing, by the UE, a retransmission on a configured active BWP from the plurality of BWPs by recombining a data associated with the deactivated BWP and the configured active BWP using a Hybrid Automatic Repeat Request (HARM) buffer.

In an embodiment, MAC CE indicates an association between a Bandwidth Part-Identity (BWP-ID) and a BWP-ID index of the active BWP.

In an embodiment, receiving, by the UE, the BWP configurations for each BWPs in a plurality of BWPs of the total bandwidth from the base station includes receiving an Uplink Bandwidth Part (UL BWP) and a Downlink Bandwidth Part (DL BWP) for each BWPs in the plurality of BWPs. Further, the method includes receiving an association between the UL BWP and the DL BWP using the RRC message from the base station.

In an embodiment, a bundling window is received for the UL BWP and the DL BWP.

In an embodiment, the association comprises a pairing relationship between the UL BWP and the DL BWP, wherein the pairing relationship is received from the base station In an embodiment, the pairing relationship between the UL BWP and DL BWP is received from the base station for Time Division Duplexing (TDD) mode of operation and a Frequency Division Duplexing (FDD) mode of operation.

In an embodiment, the active BWP is indicated to the UE using one of the MAC CE and the DCI in the RRC message, includes receiving, by the UE, the BWP configurations comprise one of:

an activation of a Component Carrier (CC) using the MAC-CE and activation of the BWP inside the CC, from the base station, and an activation of the Component Carrier (CC) and the BWP using the MAC-CE, from the base station.

Further, the method includes tuning, by the UE, to the active BWP based on the BWP configurations.

In an embodiment, the BWP configurations comprising one of the single active BWP and multiple active BWP in the plurality of BWPs includes indicating, by the UE, a capability information to the base station. Further, the method includes receiving, by the UE, at least one of a number of soft bits, a soft buffer partitioning for each BWP, and a maximum number of HARQ processes based on the capability information from the base station. Further, the method includes activating, by the UE, one of the single active BWP and the multiple active BWP in the plurality of BWP based on the capability information.

In an embodiment, receiving, by the UE, the BWP configurations for each BWPs in the plurality of BWPs of the total bandwidth from the base station, further includes receiving at least one of a timer value, a maximum number of NACK, and a Discontinuous reception (DRx) timer from the base station using the MAC Control Element (MAC-CE), the Radio Resource Control (RRC) message, and the Downlink Control Indicator (DCI).

In an embodiment, receiving, by the UE, the BWP configurations for each BWPs in the plurality of BWPs of the total bandwidth from the base station, further includes receiving, by the UE, a QCL relationship between a Demodulation Reference Signal (DMRS) and at least one reference signal for each BWP during a RRC connection using the Radio Resource Control (RRC) message.

In an embodiment, receiving, by the UE, the BWP configurations for each BWPs in the plurality of BWPs of the total bandwidth from the base station, further includes receiving by the UE, a QCL relationship between a Demodulation Reference Signal (DMRS) and at least one reference signal for the activated BWP using one of the MAC Control Element (MAC-CE), and the Downlink Control Indicator (DCI).

In an embodiment, the at least one reference signal is one of a Synchronization Signal (SS) block and a Channel State Information Reference Signal (CSI-RS).

In an embodiment, the UL BWP and the DL BWP are activated by receiving a measurement gap information within a configured frequency range of the active BWP from the base station and activating the UL BWP and the DL BWP based on the measurement gap information.

In an embodiment, the measurement gap information is used to retune at least one of a Sounding Reference Signaling (SRS) and a Channel State Information Reference Signal (CSI-RS).

In an embodiment, receiving, by the UE, the BWP configurations for each BWPs in the plurality of BWPs of the total bandwidth from the base station, further includes receiving one of a default Radio Link Monitoring Bandwidth Part (RLM BWP) and Radio Link Monitoring Reference signal (RLM RS) resources for each BWPs.

In an embodiment, receiving, by the UE, the BWP configurations for each BWPs in the plurality of BWPs of the total bandwidth from the base station, further includes receiving, by the UE, at least one of a default Bandwidth Part (BWP), a current active Bandwidth Part (BWP) for the RLM, and one of Radio Link Monitoring Reference signal (RLM RS) resources for each BWPs and the Radio Link Monitoring Reference signal (RLM RS) resources for the BWP on which RLM is to be performed from the base station. Further, the method includes receiving, by the UE, interference measurement resources on the BWP on which RLM is to be performed from the base station.

In an embodiment, receiving, by the UE, the BWP configurations for each BWPs in the plurality of BWPs of the total bandwidth from the base station, further includes receiving, by the UE, at least one of Control-Resource Set (CORESET) configurations comprising in-sync RLM resources, QCL relationship information across the each BWP of the plurality of BWPs, and an interference measurement resources for the BWP from the base station. Further, the method includes monitoring, by the UE, an in-sync measurement on at least one of the single active BWP and the multiple active BWP based on the QCL information. Further, the method includes reporting, by the UE, the in-sync measurement of each BWP to the base station.

In an embodiment, receiving, by the UE, the BWP configurations for each BWPs in the plurality of BWPs of the total bandwidth from the base station, further includes receiving, by the UE, at least one of Control-Resource Set (CORESET) configurations comprising an out-of-sync RLM resources, QCL relationship information across the each BWP of the plurality of BWPs, and an interference measurement resources for the BWP. Further, the method includes monitoring, by the UE, an out-sync measurement and a BWP threshold value on at least one of the single active BWP and the multiple active BWP based on the QCL information. Further, the method includes reporting, by the UE, the out-sync measurement of each BWP to the base station.

In an embodiment, the BWP configurations comprise a BWP threshold for the UE to trigger Out-Of-Sync (OOS), when the multiple active BWP are activated.

In an embodiment, the CORESET configurations are configured for at least one of the configured active BWP and a default BWP, wherein the default BWP is an initial active BWP indicated from the base station during an initial access configuration.

In an embodiment, the CORESET configuration comprises: a pre-defined location and a size of the initial active BWP for the UL transmission and the DL transmission using Master Information Block (MIB) and a Remaining Minimum System Information (RMSI).

In an embodiment, the method further includes receiving a location of the CORESET configuration using a Physical Broadcast Channel (PBCH) from the base station.

In an embodiment, the location is received as an offset in Resource Blocks (RBs) number using one of a SSB numerology and a RMSI numerology.

In an embodiment, receiving, by the UE, the BWP configurations for each BWPs in the plurality of BWPs of the total bandwidth from the base station, further includes receiving a set of BWPs by using at least one of a common PRB indexing and a different PRB indexing.

In an embodiment, further comprises: receiving an Uplink Physical Resource Block (UL PRB) for the common PRB indexing from the base station.

In an embodiment, further comprises: receiving frequency locations of a PRB associated with the common PRB indexing, for DL BWP and the UL BWP using at least one of the RMSI and the RRC message from the base station In an embodiment, further comprises: receiving a PRB offset level indication associated with the common PRB indexing from the base station, wherein the PRB offset level indication indicates a range from an initial PRB value to an Absolute Frequency Channel Number (ARFCN).

In an embodiment, the CORESET configurations indicate a RMSI location as the offset in RBs using a reference SSB numerology and RMSI numerology.

In an embodiment, the RMSI location is common across the SS block, partially common across the SS block and different for each SS block.

In an embodiment, the total bandwidth is a wideband CC comprising multiple SSB.

In an embodiment, the UE is configured to fallback from the configured active BWP to the default BWP for performing the radio link monitoring based on a timer value.

Accordingly the embodiments herein provide a User Equipment (UE) for handling a RLM using BWP configurations in a wireless communication system. The UE includes a RLM engine operably coupled with a memory and a processor. The RLM engine is configured to receive the BWP configurations for each BWPs in a plurality of BWPs of a total bandwidth from a base station using one of a MAC Control Element (MAC-CE), a Radio Resource Control (RRC) message, and a Downlink Control Indicator (DCI), wherein the BWP configurations comprising one of a single active BWP and multiple active BWP in the plurality of BWPs. Further, the RLM engine is configured to detect an active BWP based on the BWP configurations from the base station, wherein at least one of the active BWP and a deactivated BWP in the plurality of BWPs are indicated using one of the MAC CE and the DCI in the RRC message. Furthermore, the RLM engine is configured to perform the RLM on the active BWP using the BWP configurations.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

In accordance with an aspect of the present disclosure, an embodiment of the present invention provides a method of a base station in a wireless communication system, the method comprising: transmitting, to a user equipment (UE), a master information block (MIB) including initial downlink bandwidth part (BWP) configuration information; and transmitting, to the UE, Remaining Minimum System Information (RMSI) including initial uplink bandwidth part (BWP) configuration information, wherein the RMSI is transmitted based on the initial downlink bandwidth part (BWP) configuration information.

The method further comprises transmitting, to the UE, radio resource control (RRC) message including BWP configuration information; and transmitting, to the UE, downlink control information (DCI) including information indicating an active BWP based on the BWP configuration information, wherein the active BWP includes an uplink BWP and a downlink BWP paired with the uplink BWP.

Radio link monitoring (RLM) configuration information and information on Quasi co-location (QCL) relationship between a first reference signal and a second reference signal are associated with the BWP configuration information.

The method further comprises transmitting, to the UE, a first data based on the active BWP; identifying a change of the active BWP based on the DCI; and transmitting, to the UE, a second data based on the changed active BWP, wherein the first data and the second data are combined in the UE.

In accordance with another aspect of the present disclosure, another embodiment of the present invention provides a method of a user equipment (UE) in a wireless communication system, the method comprising: receiving, from a base station, a master information block (MIB) including initial downlink bandwidth part (BWP) configuration information; and receiving, from the base station, Remaining Minimum System Information (RMSI) including initial uplink bandwidth part (BWP) configuration information, wherein the RMSI is received based on the initial downlink bandwidth part (BWP) configuration information.

The method further comprises receiving, from the base station, radio resource control (RRC) message including BWP configuration information; and receiving, from the base station, downlink control information (DCI) including information indicating an active BWP based on the BWP configuration information, wherein the active BWP includes an uplink BWP and a downlink BWP paired with the uplink BWP.

Radio link monitoring (RLM) configuration information and information on Quasi co-location (QCL) relationship between a first reference signal and a second reference signal are associated with the BWP configuration information.

The method further comprises receiving, from the base station, a first data based on the active BWP; and receiving, from the base station, a second data based on a changed active BWP, wherein the changed active BWP is identified based on the DCI, and wherein the first data and the second data are combined.

In accordance with another aspect of the present disclosure, another embodiment of the present invention provides a base station in a wireless communication system, the base station comprising: a transceiver; and a processor operably connected to the transceiver, the processor configured to: transmit, to a user equipment (UE), a master information block (MIB) including initial downlink bandwidth part (BWP) configuration information; and transmit, to the UE, Remaining Minimum System Information (RMSI) including initial uplink bandwidth part (BWP) configuration information, wherein the RMSI is transmitted based on the initial downlink bandwidth part (BWP) configuration information.

The processor is further configured to: transmit, to the UE, radio resource control (RRC) message including BWP configuration information; and transmit, to the UE, downlink control information (DCI) including information indicating an active BWP based on the BWP configuration information, wherein the active BWP includes an uplink BWP and a downlink BWP paired with the uplink BWP.

Radio link monitoring (RLM) configuration information and information on Quasi co-location (QCL) relationship between a first reference signal and a second reference signal are associated with the BWP configuration information.

In accordance with another aspect of the present disclosure, another embodiment of the present invention provides a user equipment (UE) in a wireless communication system, the UE comprising: a transceiver; and a processor operably connected to the transceiver, the processor configured to: receive, from a base station, a master information block (MIB) including initial downlink bandwidth part (BWP) configuration information; and receive, from the base station, a Remaining Minimum System Information (RMSI) including initial uplink bandwidth part (BWP) configuration information, wherein the RMSI is received based on the initial downlink bandwidth part (BWP) configuration information.

The processor is further configured to: receive, from the base station, radio resource control (RRC) message including BWP configuration information; and receive, from the base station, downlink control information (DCI) including information indicating an active BWP based on the BWP configuration information, wherein the active BWP includes an uplink BWP and a downlink BWP paired with the uplink BWP.

Radio link monitoring (RLM) configuration information and information on Quasi co-location (QCL) relationship between a first reference signal and a second reference signal are associated with the BWP configuration information.

The processor is further configured to:receive, from the base station, a first data based on the active BWP; and receive, from the base station, a second data based on a changed active BWP, wherein the changed active BWP is identified based on the DCI, and wherein the first data and the second data are combined.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, storage circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term 'NR' is "new radio" is the term used by 3GPP specification for discussing activities about 5G communication systems.

The term "base station" and "gNB" used herein can be used interchangeably without departing from the scope of the embodiments. Further, the term "mapping" and "association" used herein can be used interchangeably without departing from the scope of the embodiments.

Embodiments herein provide a method and system for handling a RLM using BWP configurations in the wireless communication system. The method includes receiving, by a UE, the BWP configurations for each BWPs in a plurality of BWPs of the total bandwidth from a base station using one of a MAC Control Element (MAC-CE), a Radio Resource Control (RRC) message, and a Downlink Control Indicator (DCI). Further, the method includes detecting, by the UE, an active BWP from the base station based on the BWP configurations. Further, the method includes performing, by the UE, the RLM on the active BWP using the BWP configurations.

Unlike conventional methods and systems, the proposed method can be used to retransmit a data of the deactivated BWP along with data of the active BWP, when a BWP is de-activated. This results in providing a functionality such as a HARQ buffer may not be flushed when BWP is de-activated. Hence this can avoid wastage of data in the BWP.

Unlike conventional methods and systems, the proposed method can be used for managing wideband operations in a power efficient manner. This enables high data rates and also better power consumption efficiency.

The proposed method can be used to configure an initial active UL BWP configuration and an initial active DL BWP configuration for each BWP using the RMSI.

Referring now to the drawings, and more particularly to FIG. 2 through FIG. 19, there are shown preferred embodiments.

FIG. 1 is a schematic diagram illustrating a BWP configuration for a wideband operations in a wireless communication system, according to a prior art. In conventional methods, several aspects of the wideband operation such as configuring search space locations, supporting Multi-user Multiple-Input and Multiple-Output MU-MIMO for different users with different bandwidth capability sizes, bandwidth indication granularity, resource block group size, PRB bundling granularity, bandwidth configurations etc. have to be addressed. A generic term known as Bandwidth Part (BWP) is defined as a set of contiguous PRBs in frequency domain which are configured for a user. Resource allocation will be done within a BWP. Several BWP may be configured to the user but only one will be activated at a given time instant. Within the BWP, various issues mentioned above have to be addressed since each BWP is configured in a UE specific manner. Furthermore, when different users are considered for the case of supporting MU-MIMO in the downlink, the sizes of the BWP supported by each user must also be accounted for as it impacts the pre-coding design, the channel and interference estimation as a result of the same etc. BWP is a concept which does not need any RF involvement and it is a layer-1 concept. Multiple BWP may be configured and activated to a UE and this entails new operations regarding monitoring timeline, BW sizes supported etc.

Figure 2:
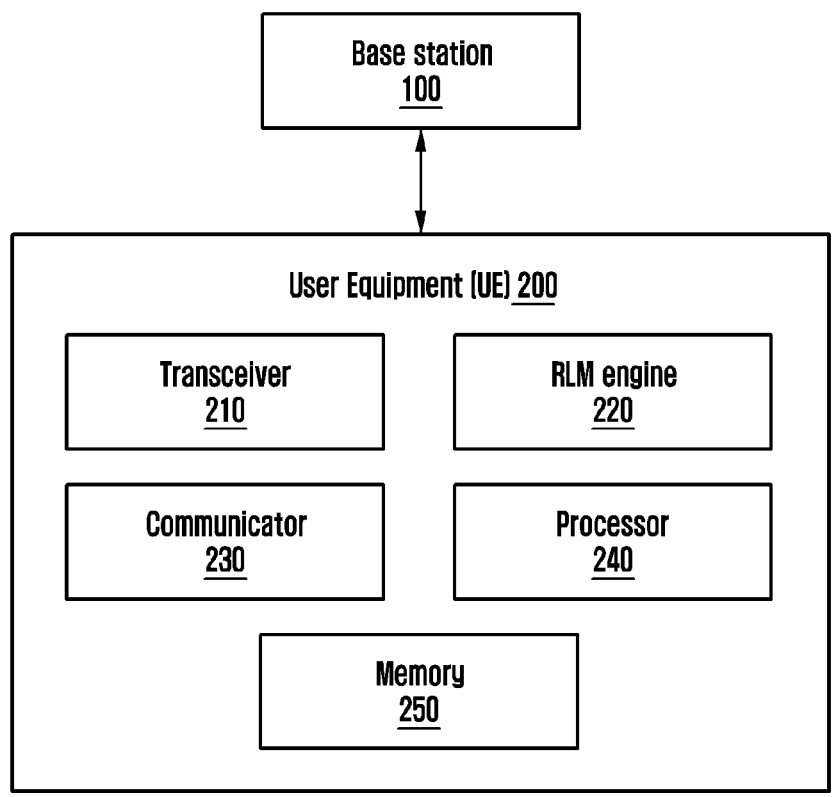
FIG. 2 is a block diagram of the US, in which a UE communicates with a BS for handling RLM in the wireless communication system, according to an embodiment as disclosed herein.

FIG. 2 is a block diagram of a wireless communication system in which the UE 200 communicates with a BS 100 for performing a RLM, according to an embodiment as disclosed herein. In an embodiment, the UE 200 includes a transceiver 210, a RLM engine 220, a communicator 230, a processor 240 and a memory 250. The UE 200 can be for e.g., a cellular telephone, a smartphone, a personal computer (PC), a minicomputer, a desktop, a laptop, a handheld computer, Personal Digital Assistant (PDA), or the like. The UE 200 may support multiple Radio access technologies (RAT) such as, for e.g., Code-division multiple access (CDMA), General Packet Radio Service (GPRS), Evolution-Data Optimized EVDO (EvDO), Time-division multiple access (TDMA), GSM (Global System for Mobile Communications, WiMAX (Worldwide Interoperability for Microwave Access) technology, LTE, LTE Advanced and 5G communication technologies.

The transceiver 210 can be configured to communicate with the BS 100 for performing a transmission and reception of signals. The BS 100 can be for example but not limited to a next Generation NodeB (gNB), evolved NodeB (eNB), NR, and the like.

In an embodiment, the RLM engine 220 receives the BWP configurations for each BWPs in a plurality of BWPs of the total bandwidth from the BS 100. The BWP configurations are received using one of a MAC Control Element (MAC-CE), a Radio Resource Control (RRC) message, and a Downlink Control Indicator (DCI).

In an embodiment, the RLM engine 220 detects an active BWP from the BS 100 based on the BWP configurations. In an embodiment, the RLM engine 220 performs the RLM on the active BWP using the BWP configurations.

In an embodiment, the RLM engine 220 detects that the active BWP is deactivated from the BS 100 based on the BWP configuration. Further, the RLM engine 220 performs a retransmission on a configured active BWP from the plurality of BWPs by recombining a data associated with a deactivated BWP and the configured active BWP using a Hybrid Automatic Repeat Request (HARM) buffer.

In an embodiment, the RLM engine 220 receives one of an activation of the MAC CE and a deactivation of the MAC CE from the BS 100 using the RRC message. In an embodiment, the MAC CE indicates an association between the BWP-ID and a BWP-ID index.

In an embodiment, the RLM engine 220 receives an Uplink Bandwidth Part (UL BWP) and a Downlink Bandwidth Part (DL BWP) for each BWPs in a plurality of BWPs. Further, the RLM engine 220 receives an association between the UL BWP and the DL BWP using the RRC message from the BS 100. The association includes a paring relationship between the UL BWP and the DL BWP from the BS 100.

In an embodiment, the RLM engine 220 activates the BWP based on the BWP configuration from the BS 100. In an embodiment, the RLM engine 220 receives the activation of a Component Carrier (CC) using the MAC-CE and activation of the BWP inside the CC from the BS 100. Further, the RLM engine 220 tunes to a specific CC and the BWP.

The MAC-CE based will require ACK/NACK from the UE 200 to confirm the BWP activation/de-activation. For the case of BWP activation along with CA based, i.e., activate Scell and also the BWP inside this Scell can be done via 2-stage mechanism: MAC-CE 1 activates Scell i.e., CC and then MAC-CE 2 activates BWP inside the Scell. Another option is to define combined carrier and BWP Id where both can be activated simultaneously via MAC-CE 1. A new MAC CE is needed for this activation since the joint CIF and BWP Id indicators must be defined. A same mechanism can be used for UL CC and UL BWP. Either an independent activation for this or some implicit activation can be relied upon for the case of UL BWP.

In another embodiment, the RLM engine 220 receives the activation of Component Carrier (CC) and the BWP using the MAC-CE from the BS 100. Further, the RLM engine 220 tunes to the specific CC and the BWP.

In an embodiment, the RLM engine 220 activates one of the single active BWP and the multiple active BWP in the plurality of BWPs of the total bandwidth is based on indicating by the UE 200 a capability information to the BS 100. Further, the RLM engine 220 receives at least one of a number of soft bits, a soft buffer partitioning, and HARQ process for each BWP during the multiple BWP activation from the BS 100 based on the capability information.

In an embodiment, when there is multiple active BWP within one CC, then multiple HARQ entities could be defined. Further, each HARQ can operate independently. The HARQ codebook could be defined per BWP, per numerology, pooling across numerology. One of the BWP can be defined for PUCCH which carries the HARQ ACK for all BWP belonging to same numerology. The following options can be defined for dynamic HARQ ACK codebook design.

For the UE 200 configured with multiple active BWP with different PDCCH monitoring periodicities (can be the same numerology or different numerology), HARQ-ACK timing can be with respect to one of the configured PDCCH monitoring periodicities. Regardless of FDD or TDD operation, when a first PDCCH monitoring periodicity is P times longer than a second PDCCH monitoring periodicity, for HARQ-ACK codebook determination, the first PDCCH monitoring periodicity corresponds to a bundling window with size of P slots for cells using the second PDCCH monitoring periodicity and operation can resemble the one in LTE for FDD-TDD CA or TDD CA with different UL-DL configurations. As shown in figure below, the slot duration is different for two DL BWP. Assuming 2 bits in DCI to indicate the HARQ-ACK timing of 1, 2, 3 and 4 slot (with reference to slots for PUCCH transmissions), and the UE 200 is configured to monitor PDCCH in every DL slot on each DL BWP. Then, for a given UL slot, e.g., #7 UL slot, the associated bundling window for DL BWP1 consists of DL slot #3~6 and DL slot #5~#12 for DL BWP2. Although we used the term slots, it could be configured in terms of mini-slots/symbols.

In an embodiment, the RLM engine 220 receives at least one of a timer value and a maximum number of NACK, and Discontinuous reception (DRx) timer from the BS 100 using the MAC Control Element (MAC-CE), the Radio Resource Control (RRC) message, and the Downlink Control Indicator (DCI).

In an embodiment, the RLM engine 220 receives the BWP configurations for each BWPs in a plurality of BWPs of the total bandwidth from the BS 100 includes receiving a QCL relationship between a Demodulation Reference Signal (DMRS) and at least one reference signal for each BWP during a RRC connection using the Radio Resource Control (RRC) message.

In an embodiment, the RLM engine 220 receives the QCL relationship between a Demodulation Reference Signal (DMRS) and at least one reference signal for the activated BWP using the MAC Control Element (MAC-CE), and the Downlink Control Indicator (DCI) during RRC connection for at least one of activation BWP and deactivation of one BWP among the plurality of BWPs. In an example, the at least one reference signal is one of a Synchronization Signal (SS) block and a Channel State Information Reference Signal (CSI-RS).

In an embodiment, When SS and CSI-RS across different BWP exists, then some relationship may be indicated to the user about how to rely on measurements done on one BWP and use it on another BWP. This is required for the case where the UE 200 doesn't have to scan for all SS blocks on all BWP. Then UE can perform measurements for beam management and/or mobility much faster. The UE 200 is signaled with a QCL relationship across multiple SS Blocks in different BWP:

QCL could be across the different SS block indexes (physically could be different beams)

QCL indication given only when the UE 200 changes form one BWP to another BWP as the UE 200 has old BWP measurements QCL information is RRC signaled across various BWP during BWP configuration itself UE is indicated QCL relationship for spatial/gain/delay/Doppler parameters This can be for CSI-RS also For beam management purposes For mobility not needed UE can be configured that all the SS blocks/CSI-RS in different BWP within a "unit resource" are QCL'ed in a set of parameters; and the SS blocks/CSI-RS across different unit resources are not QCL'ed in these set of parameters.

For DMRS used in each BWP, the QCL RS is signaled per BWP during RRC Connection establishment Or during BWP changing only (only done based on need, may be too much overhead)

In an embodiment, the RLM engine 220 activates the UL BWP and the DL BWP based on receiving a measurement gap for an outside of a configured frequency range of the active BWP from the BS 100. In an embodiment, the gap measurements is to retune at least one of Sounding Reference Signaling (SRS) and a Channel State Information Reference Signal (CSI-RS).

The BS 100 configures the measurement gap for the UE 200 based on the following procedure:

1. Then SRS/CSI-RS is configured for the UE
2. UE performs measurements/sends SRS
3. Same configuration for RRM based measurements as well irrespective of being based on SS or CSI-RS.
4. The gap timeline depends on BWP configuration
   a. For same BWP sending CSI-RS/SRS, no gap needed
   b. For outside current active BWP, gap needed
   i. Outside could mean within the configured BWPs or outside of these configured BWPs
   ii. Gap should cover time needed for re-tuning and the time duration of CSI-RS measurement/SRS resource settings (for SRS beam sweeping etc.,)

c. UE is not expected to send PUCCH or any other UL signals for outside active BWP and during this gap d. UE is not expected to monitor PDCCH or any other DL signals during this gap 5. Measurement gap for RRM
   a. Inter-cell/intra-cell measurements
   b. Within and outside configured BWP is possible
6. UE may be configured with gap patterns for all possible BWP configured via RRC i.e., the total gaps and the times needed for the gaps when one BWP to another BWP is sent for all possible combinations of the BWPs.
   a. Or configure gap pattern when a DCI/MAC-CE based BWP is activated i.e. on need basis
   b. In this case only the BWP x to BWP y information is sent to the UE based on the knowledge with the gnb 100 and UE capability.
7. Measurement for BWP (re-) configuration
   a. Via L1
   i. only within configured BWPs
   ii. both in/outside of configured BWPs
   b. Via RRM
   i. only within configured BWPs
   ii. outside of configured BWPs
   iii. both in/outside of configured BWPs
8. BWP-specific RRM measurement
   a. For inter-cell mobility
   i. A BW (or BWP) should be configured for neighbor cell measurement
   ii. The above BW (or BWP) is configured,
   Option A: implicitly (i.e. same as default BWP)
   Could be same as current active BWP and no new indication and UE could assume presence of SS block in same BWP
   Option B: explicitly (i.e. configured in RRM measurement)
   Option C: both possible via the gnb 100 indication
   b. For BWP (re-) configuration based on RRM
   i. May not be needed if L1-based approach is sufficient
   ii. Otherwise, BWP should be considered in RRM framework
   c. If BWP(s) is configured for RRM measurement,
   i. Option 1: explicitly in measurement object or ID
   ii. Option 2: implicitly based on CSI-RS configuration and scheduling BWP In an embodiment, the RLM engine 220 receives a BWP identify from the plurality of BWPs for performing the RLM. Further, the RLM engine 220 receives one of a default Radio Link Monitoring (RLM) Bandwidth Part (BWP) and Radio Link Monitoring Reference signal (RLM RS) resources for each BWPs.

In an embodiment, the RLM engine 220 receives at least one of a default Bandwidth Part (BWP), a current active Bandwidth Part (BWP) for the RLM, and one of Radio Link Monitoring Reference signal (RLM RS) resources for each BWPs and the Radio Link Monitoring Reference signal (RLM RS) resources for the BWP on which RLM to be performed from the BS 100. Further, the RLM engine 220 receives interference measurement resources on the BWP on which RLM to be performed from the BS 100.

In an embodiment, the RLM engine 220 receives at least one of Control-Resource Set (CORESET) configurations includes in-sync RLM resources, QCL relationship information across the each BWP of the plurality of BWPs, and an interference measurement resources for the BWP. Further, the RLM engine 220 monitors an in-sync measurement on at least one of the single active BWP and the multiple active BWP based on the QCL information. Further, the RLM engine 220 reports the in-sync measurement for each BWP to the BS 100.

In an embodiment, when multiple active BWP are configured for the UE, then the UE 200 may trigger OOS only when the RLM on each of these BWP is found to satisfy the RLM threshold constraints. If the estimated link quality corresponding to hypothetical PDCCH BLER based on all configured X RLM-RS resource(s) is below Q_out threshold on all the multiple active BWP (in case the RLM resources are configured in every BWP) or on the single BWP where RLM measurements are performed or on the default RLM BWP. On each of these BWP the number of RLM resources configured by the gNB to the UE 200 will be indicated by gNB to UE 200 as "X" RLM resources.

For in-synch measurements, the UE 200 will be configured to monitor the USS or CSS by the gNB. If USS, UE 200 cna monitor in the current active BWp. For the case of multiple active BWP, UE 200 will monitor in synch for each of the BWP which is active. If any of these multiple active BWP will be OOS condition satisfied, then the UE 200 may not trigger RLF. Only this BWP can be de-activated. Rest can operate as it is.

In an embodiment, the RLM engine 220 receives at least one of Control-Resource Set (CORESET) configurations includes an out-of-sync RLM resources, QCL relationship information across the each BWP of the plurality of BWPs, and an interference measurement resources for the BWP. Further, the RLM engine 220 monitors an out-sync measurement and a BWP threshold value on at least one of the single active BWP and the multiple active BWP based on the QCL information. Further, the RLM engine 220 reports the out-sync measurement to the BS 100.

The BWP_th is configured by gNB to the UE 200 to figure out when the UE 200 can trigger OOS in case of multiple active BWP. This can be fixed in spec or indicated to the UE. BWP_th>=1. If beams are used for determining beam failure and then the beam condition is used to trigger RLF, then the beams being used across BWP should be jointly used. If different beams are used across different active BWP, then RLF/RLM is done per BWP group using the same set of beams. The beam recovery/failure and the RLF will be together done based on these groups and per group.

In an embodiment, the BWP configurations includes the BWP threshold for the UE 200 to trigger Out-Of-Sync (OOS), when the multiple active BWP are activated. In an embodiment, the CORESET configurations are configured for at least one of the configured active BWP and a default BWP, where the default BWP is an initial active BWP indicated from the BS 100 during an initial access configuration.

For RLM purposes UE 200 chooses a single RS for indicating periodic IS or OOS. For each BWP, UE 200 can use RS within that BWP for RLM purposes. This can be used for RLF operations. When the RS is present in some BWP and not the current active BWP (in case of single active BWP), then the UE 200 must hop to that BWP for getting the periodic IS and OOS measurements and then declare RLM measurements and RLF. The UE 200 can fallback to the default BWP for the case of RLM/RLF purposes. This is crucial since some BWP may or may not have SS and CSI-RS configured. The gnb 100 configures the BWP which UE 200 must use for RLM purposes it could be 1 per numerology (for all BWP with same numerology) or 1 for all possible numerologies. Regardless of same or different RLF parameters per BWP, when BWP is switched UE 200 might reset or inherit the # of indications given so far in previous BWP. This behavior can be indicated to UE 200 by the gnb 100

A. Flush the RLM indications once BWP changes

B. Keep the RLM measurements and indications even when BWP changes

In an embodiment, the RLM engine 220 receives a pre-defined location and a size of the initial active BWP for the UL transmission and the DL transmission using Master Information Block (MIB) and a RMSI from the BS 100. The RLM engine 220 receives a location of the CORESET configuration in the Physical Broadcast Channel (PBCH) of the SS block (SSB). In an embodiment, the location is received as an offset in Resource Blocks (RBs) using one of a SSB numerology and a RMSI numerology.

In an embodiment, the pairing relationship between the UL BWP and DL BWP is received from the BS 100 for Time Division Duplexing (TDD) mode of operation and a Frequency Division Duplexing (FDD) mode of operation.

The relationship may be fixed in specification or indicated by the gnb 100. There could be a fixed frequency dependent relationship between UL and DL where the center/start RB location of the UL and DL BWP can be linked if and only if |fUL-fDL|<threshold. Further, the BS 100 can explicitly indicates the association between UL and DL during BWP activation/de-activation via DCI/MAC-CE/RRC is given to the UE. There could be one-one, one-many or many-to-one mapping possible for the same. These could be semi-static mapping changes between UL and DL BWP pairs can be supported via RRC, UE specific higher layer signaling.

In an embodiment, the RLM engine 220 receives at least one of a common PRB indexing and a different PRB indexing for a plurality of BWPs in the total bandwidth using the RMSI. In an embodiment, receiving Uplink Physical Resource Block (UL PRB) for the common PRB indexing from the BS 100.

In an embodiment, the RLM engine 220 receives frequency locations of the PRB for DL BWP and the UL BWP using at least one of the RMSI and the RRC message. The RLM engine 220 receives an offset from Absolute Frequency Channel Number (ARFCN) for Uplink Control Carrier (UL CC) to the PRB for the common PRB indexing. In an embodiment, the CORESET configuration indicates RMSI location as the offset in RBs using a reference SSB numerology and RMSI numerology. In an embodiment, the RMSI location is common across SS block, partially common across SS block and different for each SS block.

In an embodiment, the total bandwidth is a wideband CC includes multiple SSB. In an embodiment, a CORESET size is at least one of a fixed size for initial access and a variable size as indicated in the MIB of the PBCH.

In an embodiment, the communicator 230 is configured to communicate with the UE 200 and internally between hardware components in the BS 100. In an embodiment, the processor 240 is configured to process various instructions stored in the memory 250 for handling the RLM using BWP configuration in the wireless communication system.

The memory 250 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 250 may, in some examples, be considered a non-transitory storage medium. The term "non-transitory" may indicate that the storage medium is not embodied in a carrier wave or a propagated signal. However, the term "non-transitory" should not be interpreted that the memory 250 is non-movable. In some examples, the memory 250 can be configured to store larger amounts of information than the memory. In certain examples, a non-transitory storage medium may store data that can, over time, change (e.g., in Random Access Memory (RAM) or cache).

Although the FIG. 2 shows various hardware components of the UE 200 but it is to be understood that other embodiments are not limited thereon. In other embodiments, the UE 200 may include less or more number of components. Further, the labels or names of the components are used only for illustrative purpose and does not limit the scope of the invention. One or more components can be combined together to perform same or substantially similar function of handling the RLM in the wireless communication system.

Figure 3:
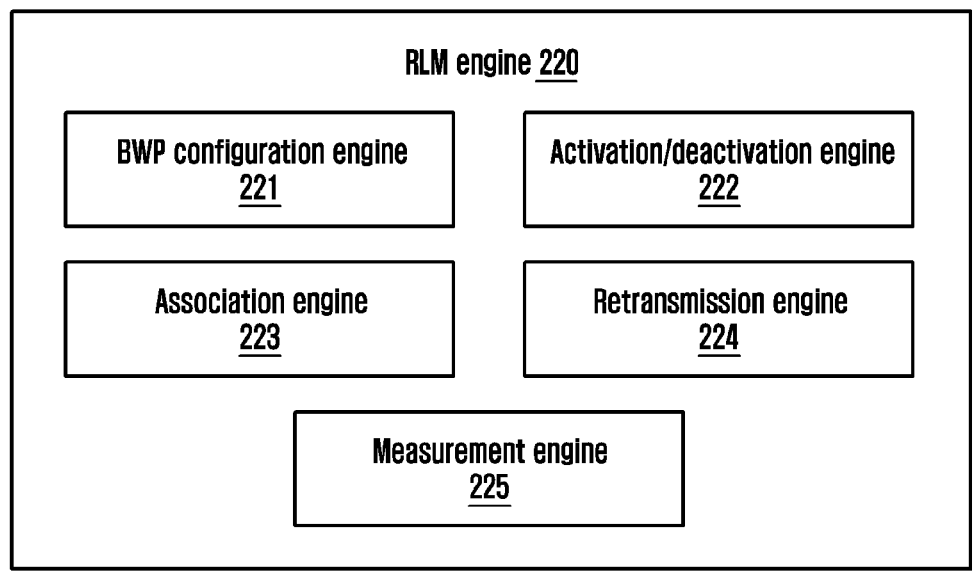
FIG. 3 is a block diagram illustrating various hardware components of a RLM engine of the UE, according to an embodiment as disclosed herein.

FIG. 3 is a block diagram illustrating the RLM engine 220 of the UE 200, according to an embodiment as disclosed herein. In an embodiment, the RLM engine 220 includes a BWP configuration engine 221, an activation/deactivation engine 222, an association engine 223, a retransmission engine 224 and a measurement engine 225.

In an embodiment, the BWP configuration engine 221 receives BWP configurations for each BWPs in the plurality of BWPs of the total bandwidth from the BS 100. In an embodiment, the activation/deactivation engine 222 detects the active BWP from the BS 100 based on the BWP configurations. In an embodiment, the activation/deactivation engine 222 performs the RLM on the active BWP using the BWP configurations.

In an embodiment, the activation/deactivation engine 222 detects that the active BWP is deactivated from the BS 100 based on the BWP configuration. Further, the activation/deactivation engine 222 performs the retransmission on the configured active BWP from the plurality of BWPs by recombining a data associated with the deactivated BWP and the configured active BWP using the Hybrid Automatic Repeat Request (HARD) buffer.

In an embodiment, the activation/deactivation engine 222 receives one of the activation of the MAC CE and the deactivation of the MAC CE from the BS 100 using the RRC message.

In an embodiment, the BWP configuration engine 221 receives the Uplink Bandwidth Part (UL BWP) and the Downlink Bandwidth Part (DL BWP) for each BWPs in the plurality of BWPs. Further, the association engine 223 receives the association between the UL BWP and the DL BWP using the RRC message from the BS 100.

In an embodiment, the activation/deactivation engine 222 activates the BWP based on the BWP configuration from the BS 100. In an embodiment, the activation/deactivation engine 222 receives the activation of a Component Carrier (CC) using the MAC-CE and activation of the BWP inside the CC from the BS 100. Further, the activation/deactivation engine 222 tunes to the specific CC and the BWP.

In another embodiment, the activation/deactivation engine 222 receives the activation of Component Carrier (CC) and the BWP using the MAC-CE from the BS 100. Further, the activation/deactivation engine 222 tunes to the specific CC and the BWP.

In an embodiment, the activation/deactivation engine 222 activates one of the single active BWP and the multiple active BWP in the plurality of BWPs of the total bandwidth is based on indicating by the UE 200 a capability information to the BS 100. Further, the BWP configuration engine 221 receives at least one of a number of soft bits, the soft buffer partitioning, and HARQ process for each BWP during the multiple BWP activation from the BS 100 based on the capability information.

In an embodiment, the BWP configuration engine 221 receives at least one of the timer value and the maximum number of NACK, and Discontinuous reception (DRx) timer from the BS 100 using the MAC Control Element (MAC-CE), the Radio Resource Control (RRC) message, and the Downlink Control Indicator (DCI).

In an embodiment, the BWP configuration engine 221 receives the BWP configurations for each BWPs in the plurality of BWPs of the total bandwidth from the BS 100 includes receiving the QCL relationship between a Demodulation Reference Signal (DMRS) and at least one reference signal for each BWP during a RRC connection using the Radio Resource Control (RRC) message.

In an embodiment, the BWP configuration engine 221 receives the QCL relationship between the Demodulation Reference Signal (DMRS) and the at least one reference signal for the activated BWP using the MAC Control Element (MAC-CE), and the Downlink Control Indicator (DCI) during RRC connection for at least one of activation BWP and deactivation of one BWP among the plurality of BWPs.

In an embodiment, the activation/deactivation engine 222 activates the UL BWP and the DL BWP based on receiving the measurement gap for the outside of the configured frequency range of the active BWP from the BS 100.

In an embodiment, the BWP configuration engine 221 receives the BWP identity from the plurality of BWPs for performing the RLM. Further, the activation/deactivation engine 222 receives one of the default Radio Link Monitoring (RLM) Bandwidth Part (BWP) and Radio Link Monitoring Reference signal (RLM RS) resources for each BWPs.

In an embodiment, the BWP configuration engine 221 receives at least one of the default Bandwidth Part (BWP), the current active Bandwidth Part (BWP) for the RLM, and one of Radio Link Monitoring Reference signal (RLM RS) resources for each BWPs and the Radio Link Monitoring Reference signal (RLM RS) resources for the BWP on which RLM to be performed from the BS 100. Further, the BWP configuration engine 221 receives interference measurement resources on the BWP on which RLM to be performed from the BS 100.

In an embodiment, the BWP configuration engine 221 receives at least one of Control-Resource Set (CORESET) configurations includes the in-sync RLM resources, the QCL relationship information across the each BWP of the plurality of BWPs, and the interference measurement resources for the BWP. Further, the measurement engine 225 monitors the in-sync measurement on the at least one of the single active BWP and the multiple active BWP based on the QCL information. Further, the measurement engine 225 reports the in-sync measurement for each BWP to the BS 100.

In an embodiment, the BWP configuration engine 221 receives the at least one of Control-Resource Set (CORESET) configurations includes the out-of-sync RLM resources, the QCL relationship information across the each BWP of the plurality of BWPs, and the interference measurement resources for the BWP. Further, the measurement engine 225 monitors the out-sync measurement and the BWP threshold value on the at least one of the single active BWP and the multiple active BWP based on the QCL information. Further, the measurement engine 225 reports the out-sync measurement to the BS 100.

In an embodiment, the BWP configuration engine 221 receives the pre-defined location and the size of the initial active BWP for the UL transmission and the DL transmission using Master Information Block (MIB) and the RMSI from the BS 100. The BWP configuration engine 221 receives the location of the CORESET configuration in the Physical Broadcast Channel (PBCH) of the SS block (SSB). In an embodiment, the location is received as the offset in Resource Blocks (RBs) using one of the SSB numerology and the RMSI numerology.

In an embodiment, the BWP configuration engine 221 receives at least one of the common PRB indexing and the different PRB indexing for the plurality of BWPs in the total bandwidth using the RMSI. In an embodiment, receiving Uplink Physical Resource Block (UL PRB) for the common PRB indexing from the BS 100.

In an embodiment, the BWP configuration engine 221 receives frequency locations of the PRB for DL BWP and the UL BWP using at least one of the RMSI and the RRC message. The BWP configuration engine 221 receives the offset from Absolute Frequency Channel Number (ARFCN) for Uplink Control Carrier (UL CC) to the PRB for the common PRB indexing.

Figure 4:
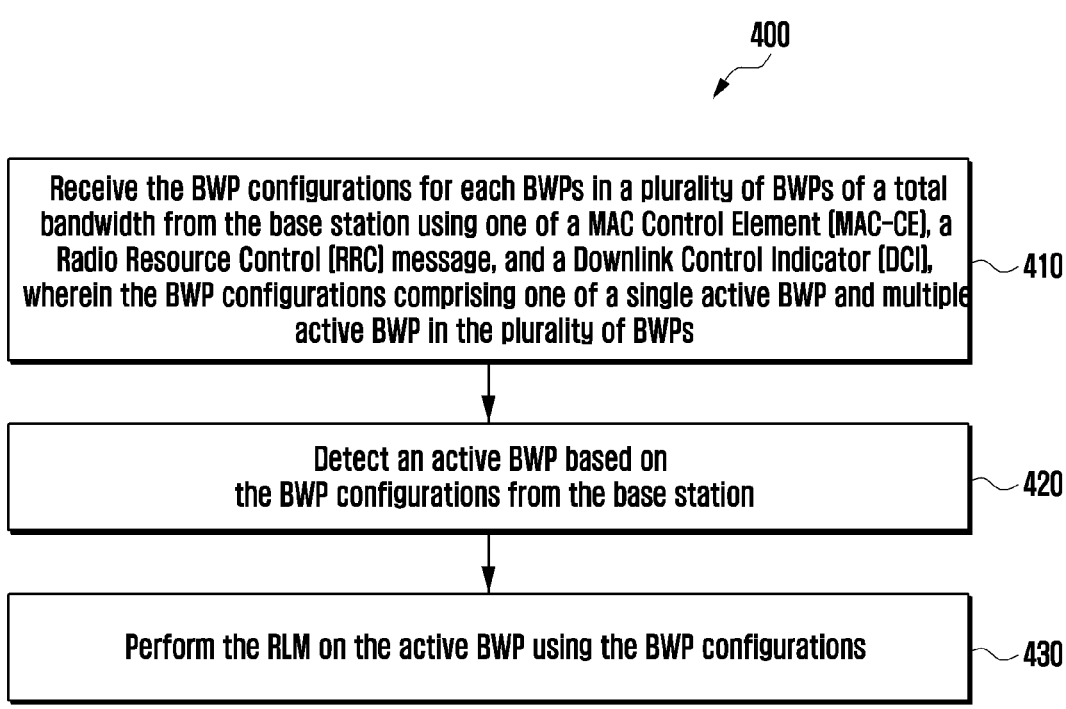
FIG. 4 is a flow diagram illustrating various operations, implemented on the UE, for handling the RLM using the BWP configurations, according to embodiments as disclosed herein.

FIG. 4 is a flow diagram 400 illustrating various operations, implemented on the UE, for handling the RLM using the BWP configurations, according to embodiments as disclosed herein.

At step 410, the method includes receiving the BWP configurations for each BWPs in the plurality of BWPs of the total bandwidth from the BS 100 using one of the MAC Control Element (MAC-CE), the Radio Resource Control (RRC) message, and the Downlink Control Indicator (DCI), where the BWP configurations comprising one of a single active BWP and multiple active BWP in the plurality of BWPs. In an embodiment, the method allows the BWP configuration engine 221 to receive the BWP configurations for each BWPs in a plurality of BWPs of a total bandwidth from the base station using one of a MAC Control Element (MAC-CE), the Radio Resource Control (RRC) message, and the Downlink Control Indicator (DCI), wherein the BWP configurations comprising one of the single active BWP and multiple active BWP in the plurality of BWPs.

At step 420, the method includes detecting the active BWP based on the BWP configurations from the base station 100. In an embodiment, the method allows the activation/deactivation engine 222 to detect the active BWP based on the BWP configurations from the base station 100.

At step 430, the method includes performing the RLM on the active BWP using the BWP configurations. In an embodiment, the method allows the activation/deactivation engine 222 to perform the RLM on the active BWP using the BWP configurations.

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

Figure 5:
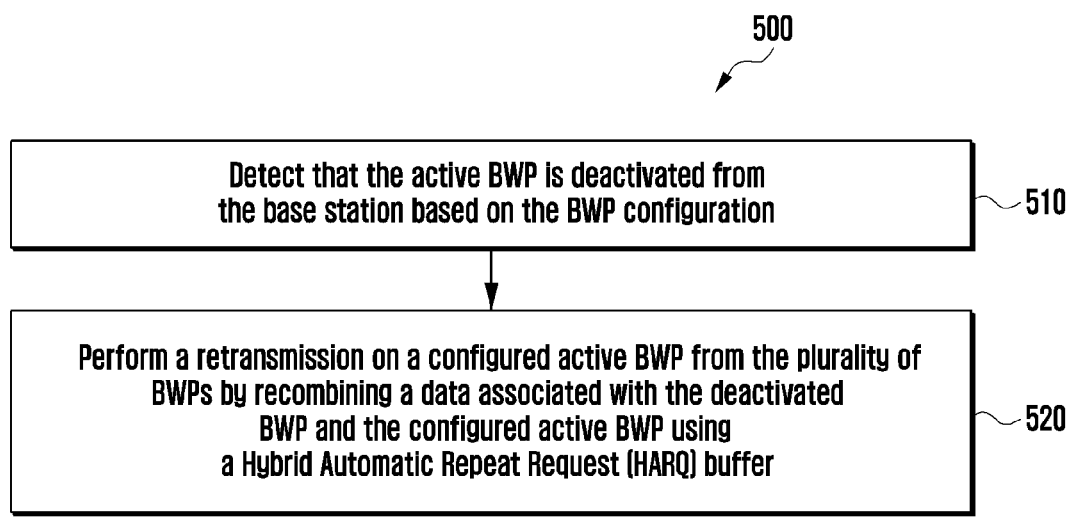
FIG. 5 is a flow diagram illustrating various operations, implemented on the UE, for handling the RLM using the BWP configurations, according to embodiments as disclosed herein.

FIG. 5 is a flow diagram 500 illustrating various operations, implemented on the UE, for handling the RLM using the BWP configurations, according to embodiments as disclosed herein.

At step 510, the method includes detecting that the active BWP is deactivated from the base station 100 based on the BWP configuration. In an embodiment, the method allows the activation/deactivation engine 222 to detect that the active BWP is deactivated from the base station 100 based on the BWP configuration.

At step 520, the method includes performing the retransmission on the configured active BWP from the plurality of BWPs by recombining the data associated with the deactivated BWP and the configured active BWP using a Hybrid Automatic Repeat Request (HARQ) buffer. In an embodiment, the method allows the activation/deactivation engine 222 to perform the retransmission on the configured active BWP from the plurality of BWPs by recombining the data associated with the deactivated BWP and the configured active BWP using a Hybrid Automatic Repeat Request (HARQ) buffer.

The various actions, acts, blocks, steps, or the like in the flow diagram 500 may be performed in the order presented, in a different order or simultaneously. Further, in some embodiments, some of the actions, acts, blocks, steps, or the like may be omitted, added, modified, skipped, or the like without departing from the scope of the invention.

Figure 6:
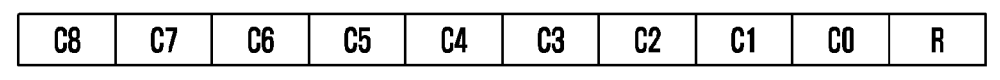

FIG. 6 illustrates an activation/deactivation of the MAC control element, according to an embodiment as disclosed herein. The activation/Deactivation of the MAC CE involves the following procedure. The MAC CE indicates a mapping between a BWP-ID and an index given by the MAC CE. The mapping is configured in RRC connection configuration message to the UE. The RRC configuration message indicates a size of the MAC CE, since a number of BWP can be changed by the RRC and is done for every reconfiguration of the BWPs for the UE 200 in a UE 200 specific manner. Otherwise, a maximum bit field size is fixed for all UEs and then zero padded from a Least Significant Bit (LSB) or a Most Significant Bit (MSB) to ensure common design for all different types of the UE.

In an example, as shown in the table 1, if BWPId=1 and BWPIdIndex=2 means that the physical BWPId 1 will be activated by using the C1 bit field in the MAC CE.

If X bits are active, then X BWPs are activated.

a. If multiple BWPs are used only for case of multiple numerology support and, that there is only 1 BWP per numerology then, at most three simultaneous BWP activations will be allowed in NR considering #numerology per band. Hence, 8 bits are enough to indicate which BWP is activated.

b. For the case when multiple active BWP can be used for same numerology, more bits are needed and the size of this MAC CE depends on the limitations based on all UEs which can support "X" simultaneously active BWP.

TABLE 1

Mapping between the BWPId Index and the MAC CE

| BWP ID index | C2 | C1 | C2 |
|---|---|---|---|
| 0 | 0 | 0 | 0 |
| 1 | 0 | 0 | 1 |
| 2 | 0 | 1 | 0 |

The table 1 illustrates the mapping of the BWPId Index to BWPId via RRC. The BS is configured to indicate the mapping to the UE, when the BWP is configured or re-configured via the RRC. In an embodiment, the indication can be provided using one of RMSI, DCI and MAC CE. Further, a similar mapping procedure is followed for performing the BWP activation of DL and UL. A different MAC CE for each DL and UL can be sent for the UE 200 where each indicated by RRC. The BS can be configured to indicate separate sizes for the DL MAC CE and the UL MAC CE to the UE, as the number of BWP can be different. The indication can be provided using the RMSI, RACH configuration, RRC connection establishment procedure or via RRC signaling in the connected mode.

Figure 7:
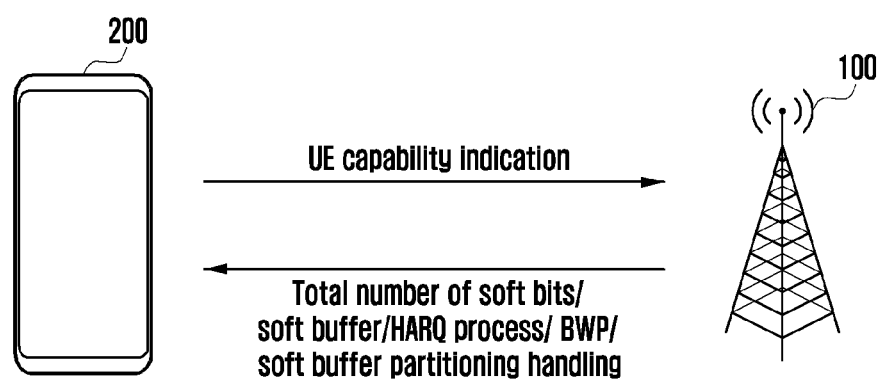
FIG. 7 illustrates a method for calculating a UE capability in terms of BWP and HARQ technique, according to an embodiment as disclosed herein.

FIG. 7 illustrates a method for calculating the UE 200 capability in terms of BWP and HARQ technique, according to an embodiment as disclosed herein. The following HARQ procedures may be defined for a case of single and multiple active BWP accordingly. The UE 200 is configured to send a capability indication to the BS 100. Upon receiving the capability indication, the BS 100 indicates to the UE 200 the following behavior via the DCI:

A. When BWP is de-activated, the HARQ buffer is flushed

B. To allow recombining data and reTx across BWP, HARQ buffer may not be flushed when BWP is de-activated. In an embodiment, the method can be used to support HARQ retransmission across DL (UL) BWPs when the UE's active DL BWP or UL BWP is switched.

For instance, if the UE 200 receives a data on one BWP and if there is a signal from the BS to switch to another BWP, the UE 200 can retransmit the data of the deactivated BWP along with the data of the activated BWP. The deactivated BWP is an old BWP and the activated BWP is the new BWP.

C. Only when a New Data Indicator (NDI) bit=0 in the new activated BWP, then the soft buffer is flushed corresponding to data on the old BWP.

D. Code Block Groups (CBGs) or Code Blocks (CBs) which are incorrectly decoded are flushed only in the active BWP.

E. The BS 100 indicates to the UE 200 the behavior among the above

The BS 100 can be configured to indicate the UE 200 200 a soft buffer partitioning per BWP in case the BS supports multiple active BWP for the UE. In multiple active BWP scenario, different data rates can exist per BWP and each BWP has its own TB even though the number of actually used HARQ processes can be similar/same. As shown in the below table 2, the maximum number of simultaneously active BWP that one UE 200 can support can be dependent on the maximum number of HARQ processes depending on the UE 200 capability. The UE 200 capability is exchanged during RRC CONN setup phase. Then the gnb 100 will configure at least one of a total number of soft bits, a soft buffer, maximum number of HARQ processes, maximum number of simultaneously active BWP, soft buffer partitioning handling to the UE.

TABLE 2

UE 200 capability indication in terms of BWP and HARQ procedures

| UE category (UE capability information) | Number of simultaneously active BWP supported |
|---|---|
| 1 | x1 |
| 2 | x2 |
| 3 | x3 |
| 4 | x4 |
| ... | ... |

Figure 8:
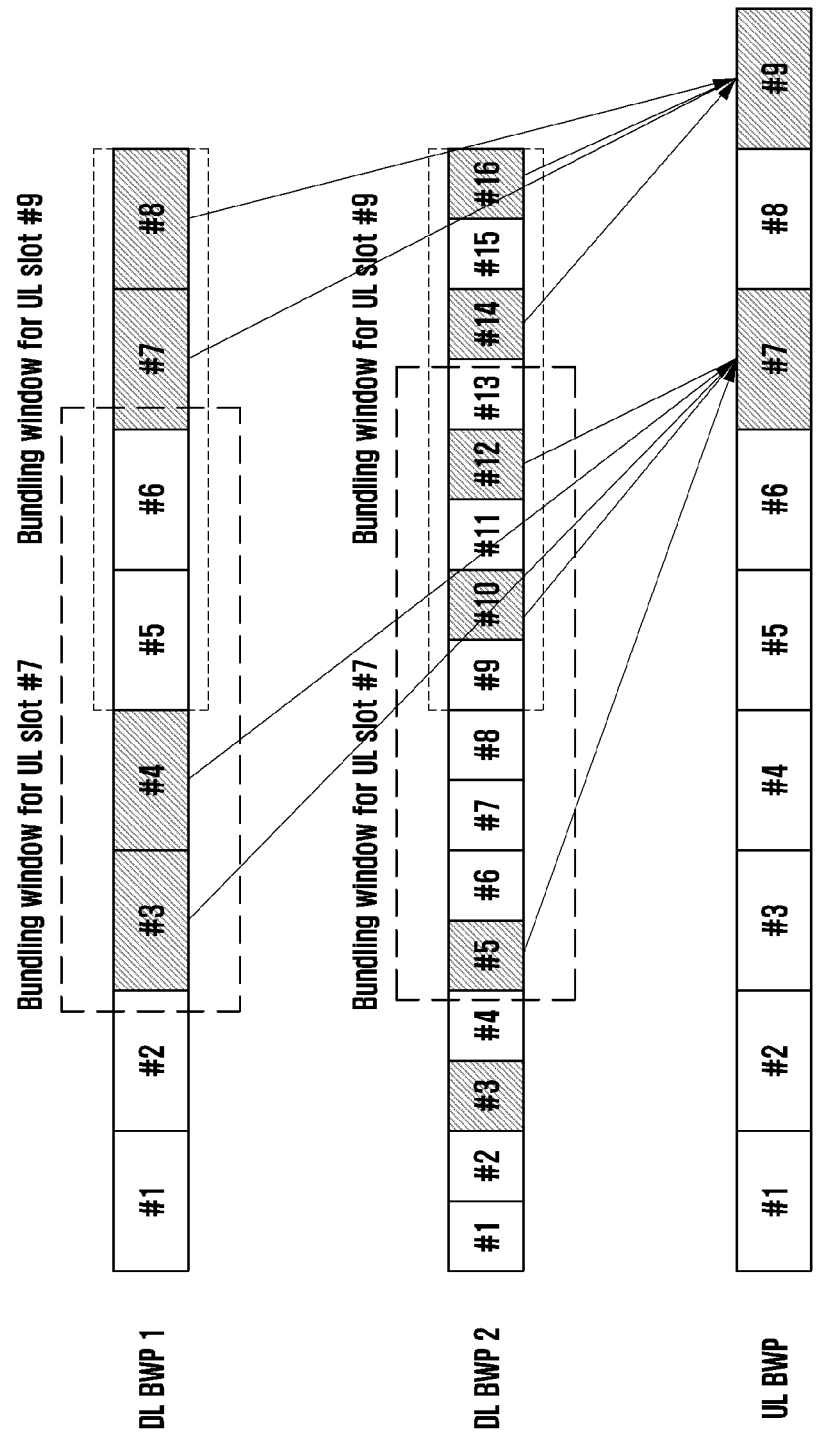
FIG. 8 illustrates a channel state in bundling window for downlink BWP with different numerology, according to an embodiment as disclosed herein.

FIG. 8 illustrates a channel state in bundling window for downlink BWP with different numerology, according to an embodiment as disclosed herein. When there is multiple active BWP within one CC, then multiple HARQ entities could be defined. Then each HARQ could operate independently. The HARQ codebook could be defined per BWP, per numerology, pooling across numerology. One of the BWP can be defined for PUCCH which carries the HARQ ACK for all BWP belonging to same numerology. The following options can be defined for dynamic HARQ ACK codebook design For a UE 200 configured with multiple active BWP with different PDCCH monitoring periodicities (can be the same numerology or different numerology), HARQ-ACK timing can be with respect to one of the configured PDCCH monitoring periodicities. Regardless of FDD or TDD operation, when a first PDCCH monitoring periodicity is P times longer than a second PDCCH monitoring periodicity, for HARQ-ACK codebook determination, the first PDCCH monitoring periodicity corresponds to a bundling window with size of P slots for cells using the second PDCCH monitoring periodicity and operation can resemble the one in LTE for FDD-TDD CA or TDD CA with different UL-DL configurations. As shown in FIG. 8, the slot duration is different for two DL BWP. Assuming 2 bits in DCI to indicate the HARQ-ACK timing of 1, 2, 3 and 4 slot (with reference to slots for PUCCH transmissions), and the UE 200 is configured to monitor PDCCH in every DL slot on each DL BWP. Then, for a given UL slot, e.g., #7 UL slot, the associated bundling window for DL BWP1 consists of DL slot #3~6 and DL slot #5~#12 for DL BWP2. Although we used the term slots, it could be configured in terms of mini-slots/symbols.

Figure 9:
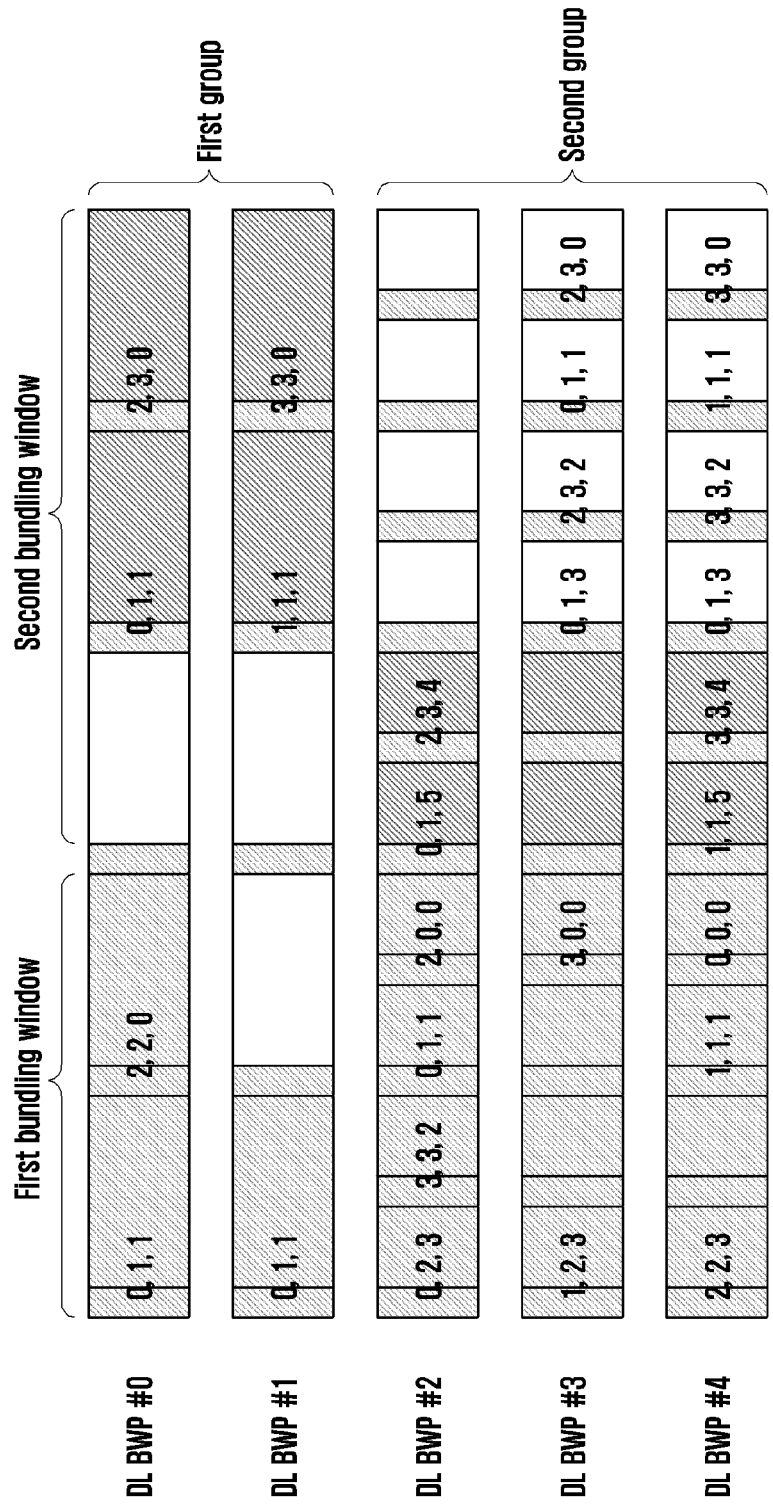
FIG. 9 illustrates the channel state to determine HARQ-ACK codebook for a particular group of BWPs, according to an embodiment as disclosed herein.

FIG. 9 illustrates the channel state to determine HARQ-ACK codebook for a particular group of BWPs, according to an embodiment as disclosed herein. In an embodiment, the use of {Counter DAI, Total DAI, Timing Indication} for HARQ-ACK codebook determination. The counters are maintained for a group of BWPs.

The DAI (Downlink Assignment Index) is an index, which is communicated to UE 200 by BS to prevent ACK/NACK reporting errors due to HARQ ACK/NAK bundling procedure performed by the UE. In an embodiment, the Dynamic HARQ ACK codebook determination is desirable for minimizing HARQ-ACK payload and improving resource utilization and coverage. The total Downlink Assignment Index DAI and counter DAI based method from release 13 enhanced Carrier Aggregation (eCA) can be a starting point. The DAI is determined or accumulated within a bundling window that can include a variable number of PDSCH transmissions and the last PDSCH transmission can be determined from the HARQ-ACK timing indication in the DCI.

Figure 10:
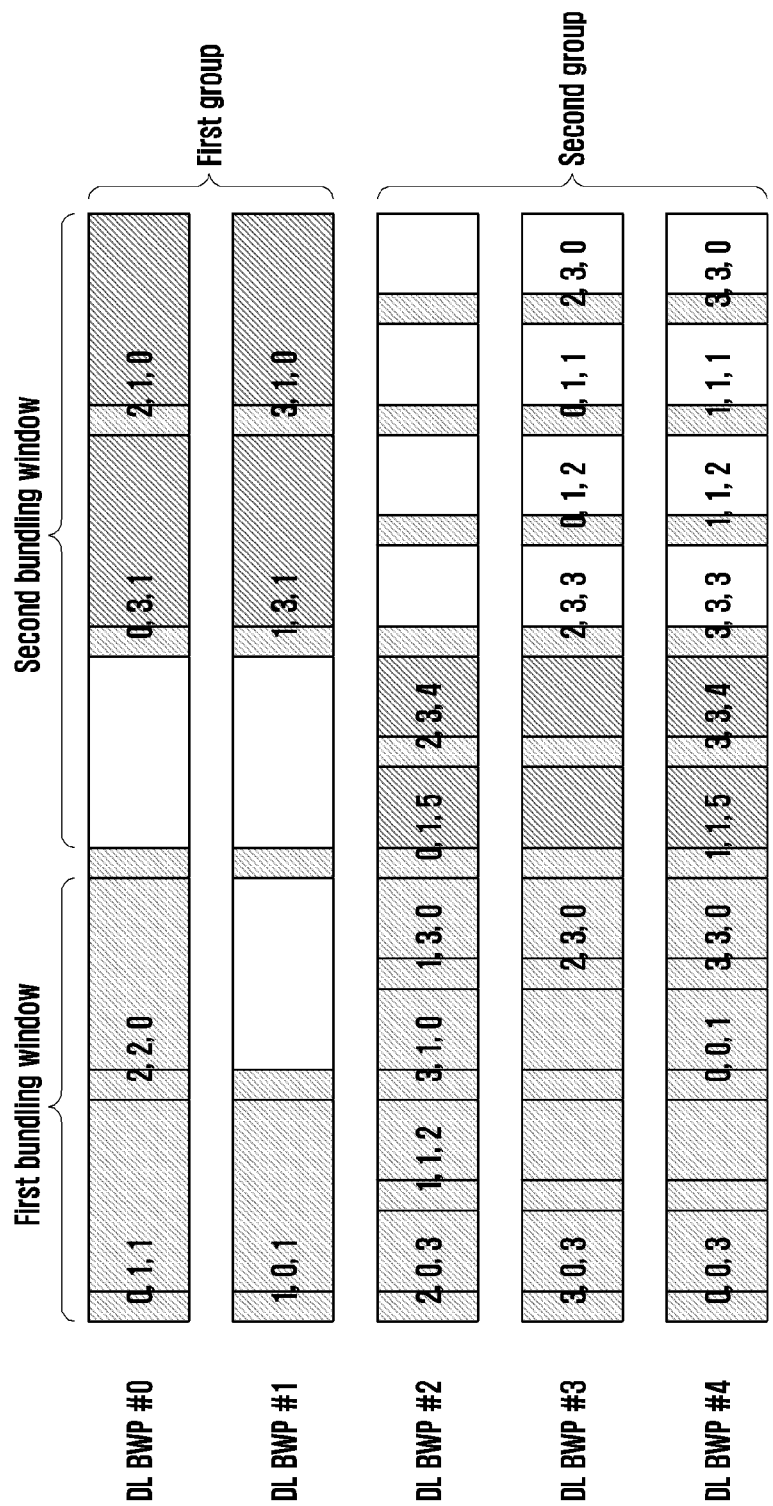
FIG. 10 illustrates the channel state to determine a HARQ-ACK codebook for the particular group of BWPs, according to an embodiment as disclosed herein.

FIG. 10 illustrates the channel state to determine HARQ-ACK codebook for the particular group of BWPs, according to an embodiment as disclosed herein. In an embodiment, the use of {Counter DAI, Total DAI, Timing Indication} for HARQ-ACK codebook determination. The counters are maintained for all BWPs jointly.

For the operation of a DAI field, BWPs using different PDCCH monitoring periodicities can be divided into respective groups according to the PDCCH monitoring periodicity. A value of a DAI field in a DL DCI format is set with respect to BWPs with same PDCCH monitoring periodicity. Figure x below illustrates an example for the functionality of {Counter DAI, Total DAI, Timing Indication} fields where the Counter DAI and the Total DAI functionality is as for en LTE. Alternatively, the value of DAI is set to the total number of PDCCHs across all scheduled DL BWPs in the order of PDCCH occasion in time domain, as shown in FIG. 10. These mechanisms change in the manner DAI is counted a) within a small group of BWPs with some common property or b) for all BWPs together.

Figure 11:
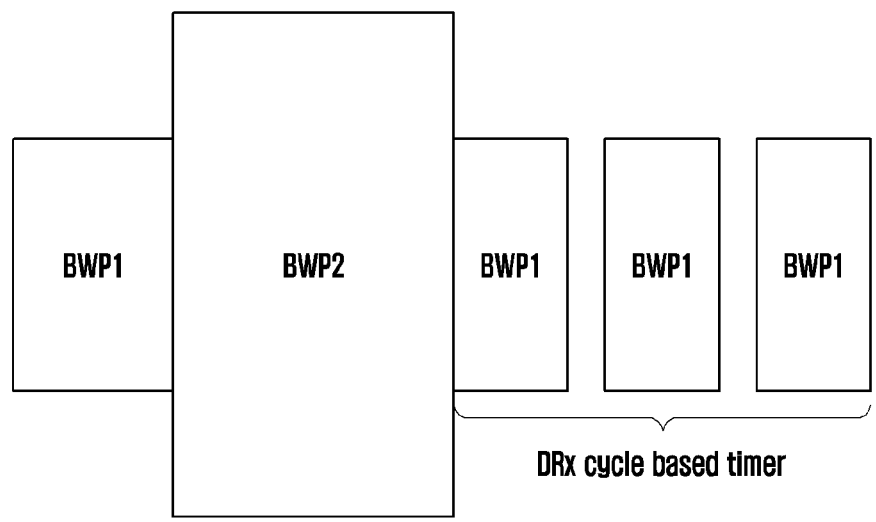
FIG. 11 illustrates a DRx timer determination for the activation and de-activation of the BWP, according to an embodiment as disclosed herein.

FIG. 11 illustrates a DRx timer determination for the activation and de-activation of the BWP, according to an embodiment as disclosed herein. The timer based activation/de-activation mechanism for BWP as follows:

Based on a timer, the UE 200 may monitor smaller BW and wider BW. The smaller BW can be the default BWP where the UE 200 will come back based on timer expiry.

A. For idle mode, UE 200 needs only initial active BWP (or/default BWP) for paging purposes a. DRx timer based fallback is supported and seems most reasonable b. Connected mode DRx timer onDuration etc may be used for monitoring the smaller BW—could again be default BWP B. The restriction of timer based BWP switching to DRX mode is beneficial.

a. Since pattern may be valid in DRX mode, there is no need of separate configuration for BWP pattern. In addition, the minimum modification is nothing but the configuration of BWP which is used for DRX mode in default. We can reuse existing DRX configuration without much modification.

C. Else for flexibility, some additional new timers based on the DRx mechanism may be directly used as shown in the FIG. 13.

Figure 12:
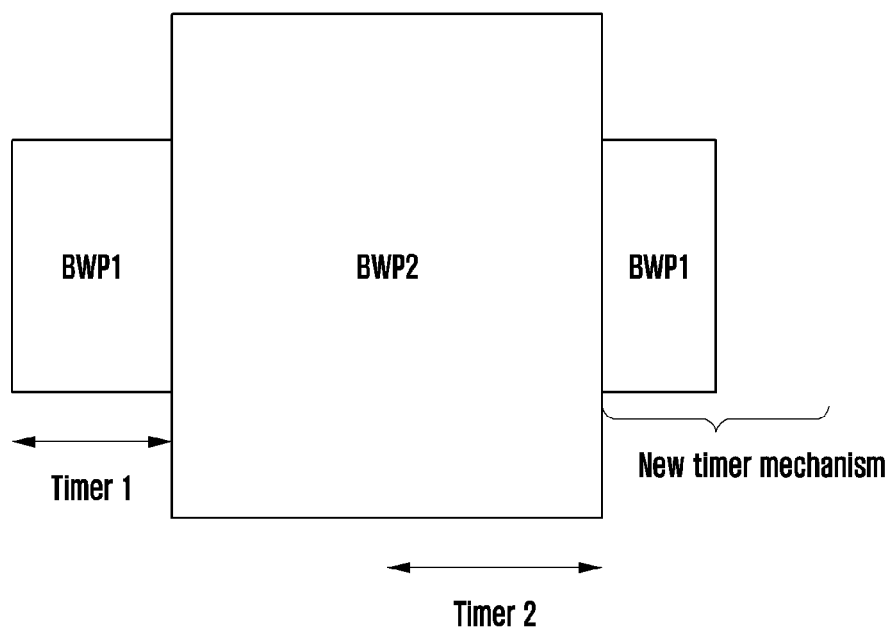
FIG. 12 illustrates a method for DCI indication to the UE, according to an embodiment as disclosed herein.

FIG. 12 illustrates a method for DCI indication to the UE, according to an embodiment as disclosed herein. As shown in the FIG. 12, a new timer is introduced, in which the new timer is remove the necessity of DCI indication for fallback to default BWP and de-link from DRx concept.

The BS indicates to the UE 200 via DCFMAC/RRC these timers and its values where these timers can be longer length compared to onDuration and dRxInactivity. This enables for more flexible data traffic adaption. They need not be coupled with DRx. They can be used for full buffer traffic/video etc. where the data may change to low and high load on and off manner. But this can be by the gnb 100 configuration. The gnb 100 indicates to UE 200 these timers via RRC/DCI/MAC-CE and then also indicates the starting of the timer based operations.

Figure 13:
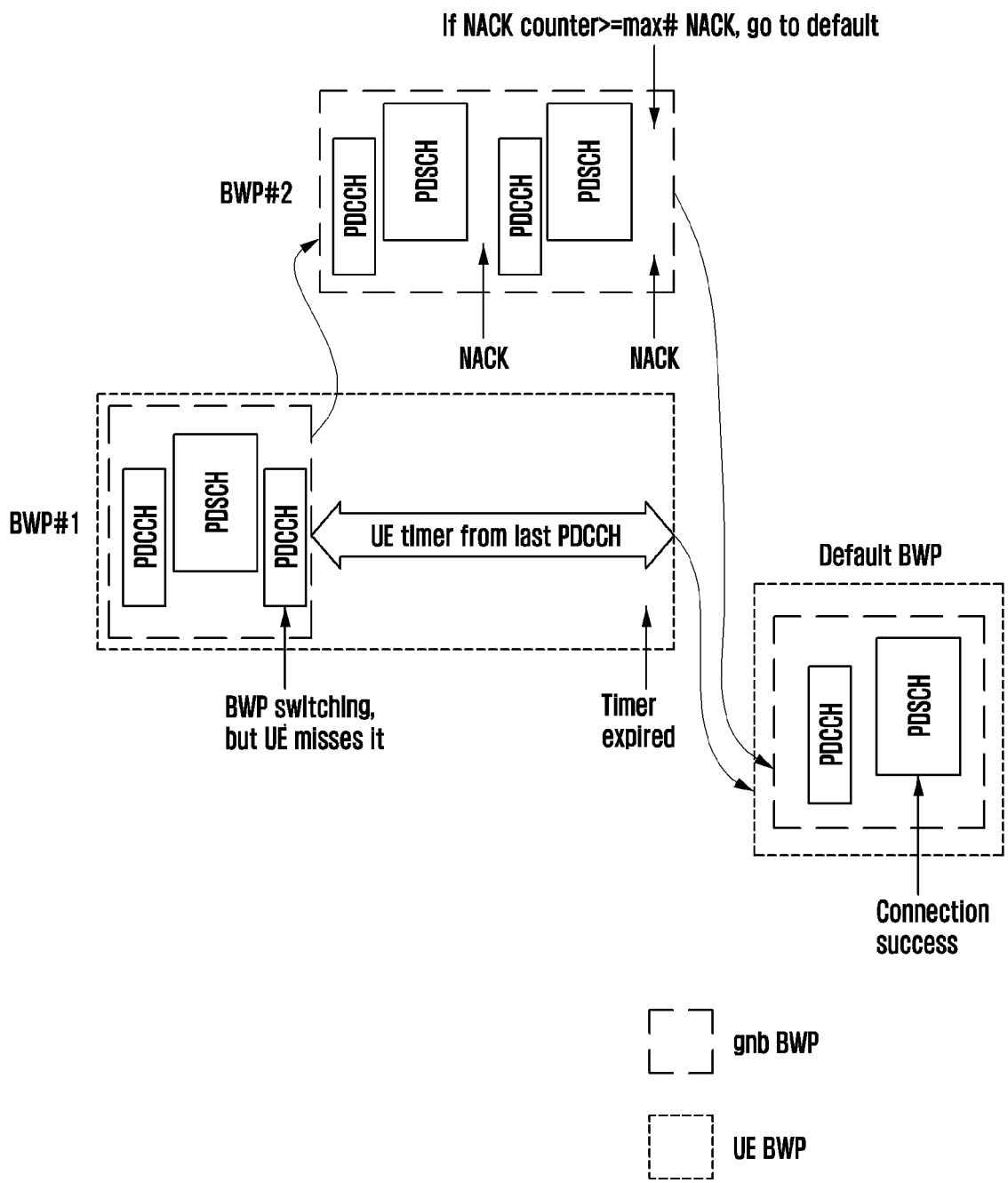
FIG. 13 is an example scenario illustrating a method of DCI-based BWP activation and a timer-based fall back mode operation, according to an embodiment as disclosed herein.

FIG. 13 is an example scenario illustrating a method of DCI-based BWP activation and timer-based fall back mode operation, according to an embodiment as disclosed herein. Consider that one of configured BWPs becomes default BWP which is decided by the gnb 100. Similar to C-DRX timer, an UE 200 has a timer which is reset whenever PDCCH is received. If the UE 200 doesn't receive any PDCCH until timer is expired, UE 200 goes to default BWP and monitors PDCCH again. From the gnb 100 perspective, after BWP switching indication, the gnb 100 transmits data within configured active BWP. If a certain number of consequent NACK is received, the gnb 100 may acknowledge the UE 200 misses BWP switching indication. Then, the gnb 100 goes to default BWP and resume transmission with the UE. The timer duration and the number of maximum NACK can be configurable via RRC signaling to provide network flexibility.

Figure 14:
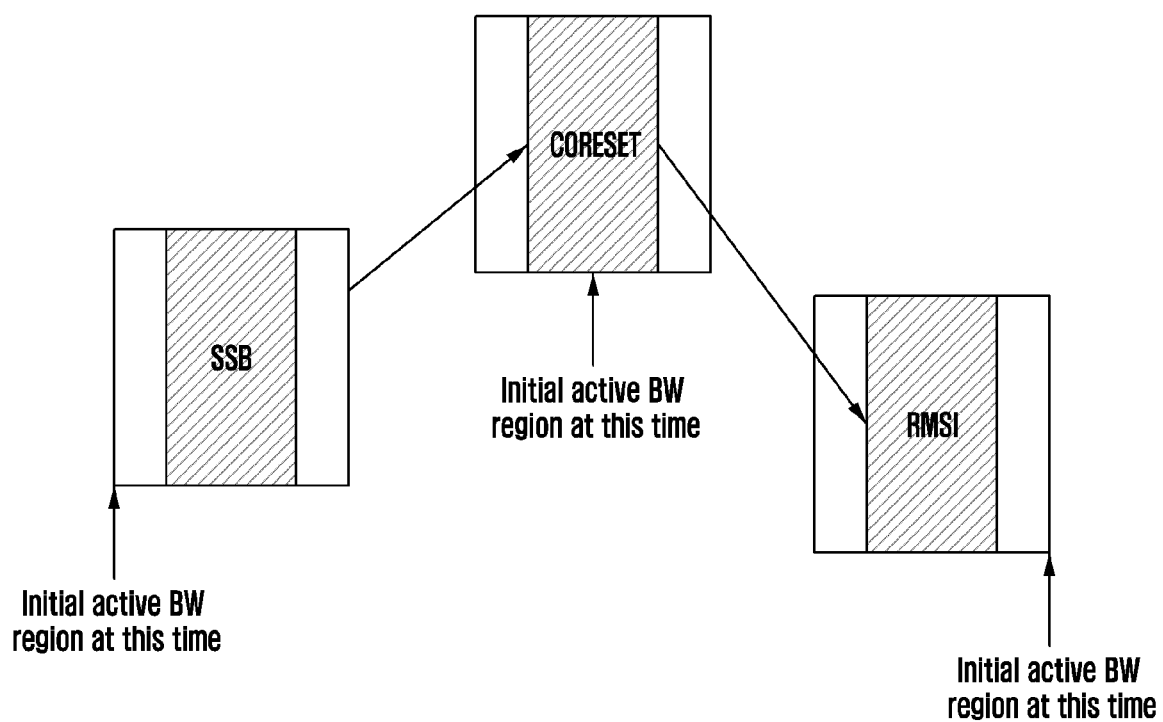
FIG. 14 is an example scenario for the BWP configuration, according to an embodiment as disclosed herein.

FIG. 14 is an example scenario for the BWP configuration, according to an embodiment as disclosed herein.

Initial active BWP Configuration: As shown in the FIG. 14, there is no explicit indication of BWP Configuration to the UE 200 by the BS. The UE 200 is not needed to open its RF BW for more than the RMSI. So if UE 200 is such that it opens up minimum, then RMSI BW is minimum BW necessary to finish initial access. The following procedure is identified.

PBCH in SSB indicates CORESET location as offset in RB number using the reference numerology for SS or via the numerology configured for RMSI. The CORESET size could be fixed for initial access in the specification or else, indicate size of CORESET in PBCH MIB. This CORESET indicates RMSI location as offset in RBs again via the reference SSB numerology or in terms of the RMSI numerology. The CORESET indicates RMSI size and allocation via CORESET. Else, fixed size of RMSI BW assumed. Note that all these signaling is from the gnb 100 to UE.

Figure 15:
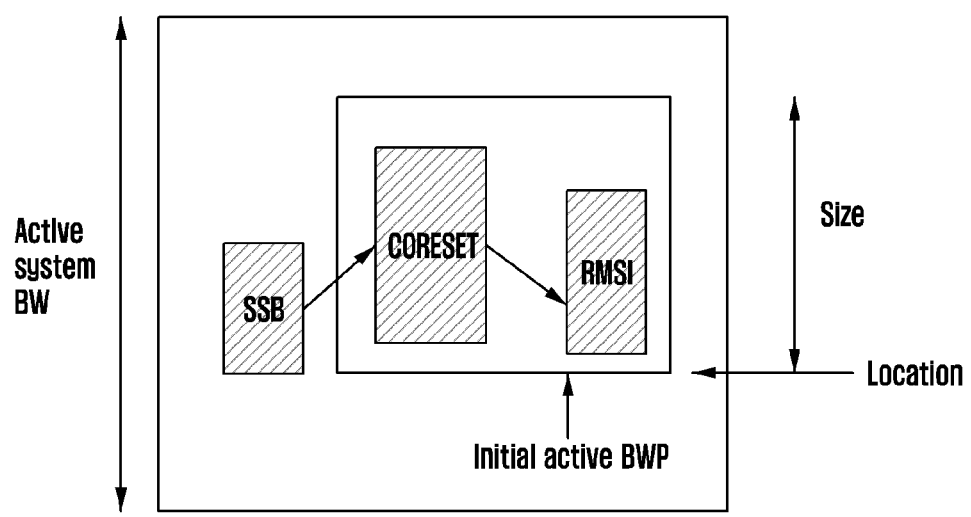
FIG. 15 is an example scenario for the BWP configuration, according to an embodiment as disclosed herein.

FIG. 15 is an example scenario for the BWP configuration, according to an embodiment as disclosed herein. In an embodiment, the UE 200 may not know system BW during initial access stage. Instead, the UE 200 can perform initial access by using initial active BWP as shown in FIG. 16A-16C.

Figure 16A:
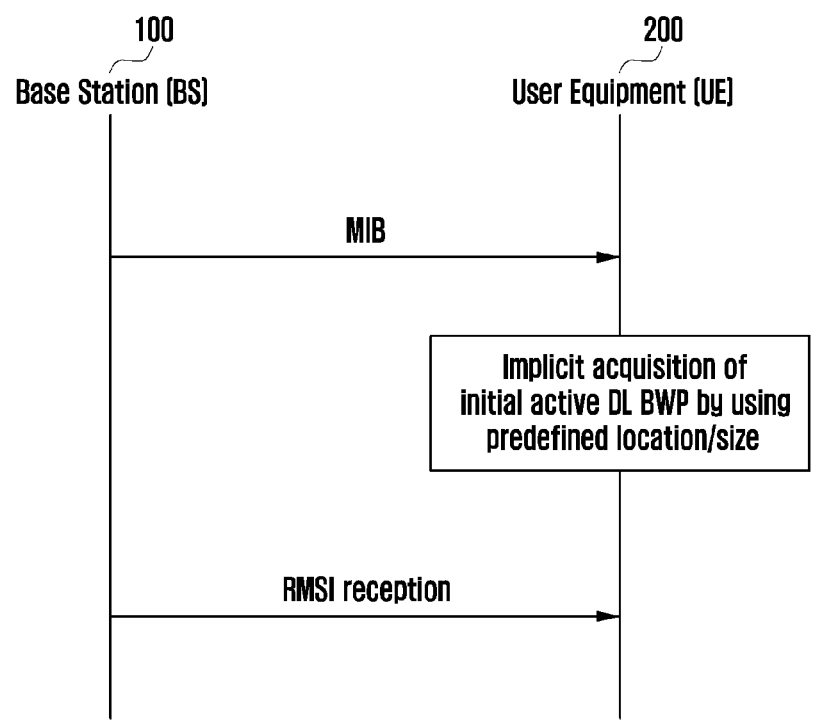
FIGS. 16A-16C illustrate sequence diagrams depicting a signaling message communicated between the BS and UE, according to an embodiment as disclosed herein.
Figure 16B:
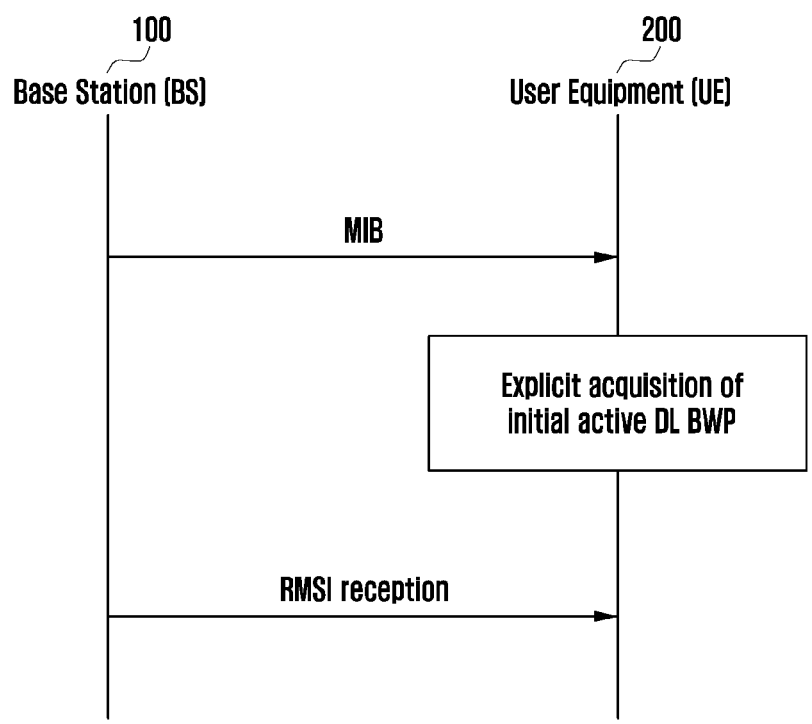
Figure 16C:
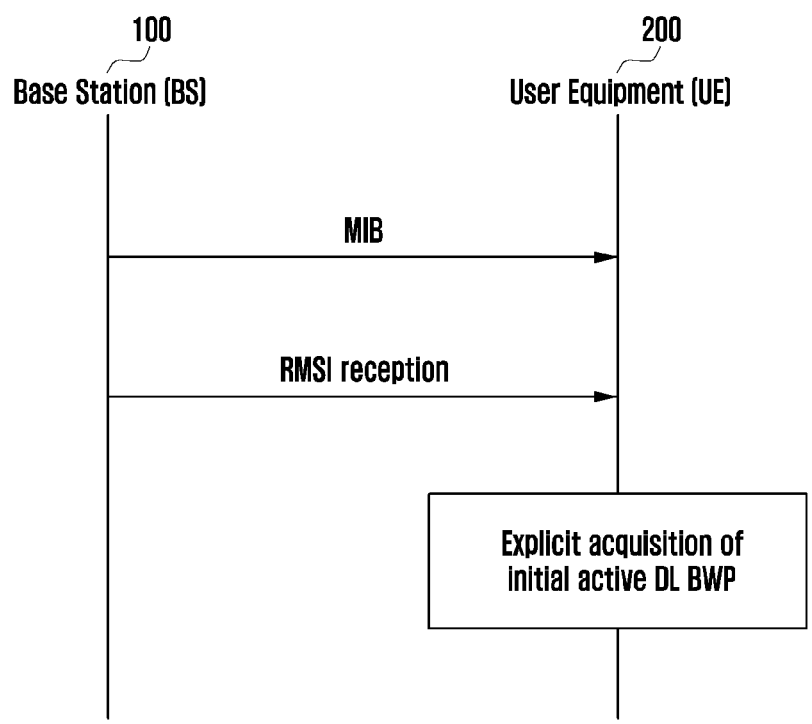

FIGS. 16A-16C illustrate sequence diagrams depicting a signaling message communicated between the BS and UE, according to an embodiment as disclosed herein. The following mechanisms are used for indication of the initial active BWP for the UE 200 start or center location and the size. The possible techniques are:
 1. Pre-defined location and size;
 2. Indicated via MIB In an embodiment, the BWP configuration engine 221 receives the initial active BWP Indicated via RMSI, in this case, RMSI reception has to be performed by using another mechanism such as PRB offset indication. As shown in the FIGS. 16A-16C, the BS 100 indicates the initial active DL BWP to the UE 200 200.

Figure 17A:
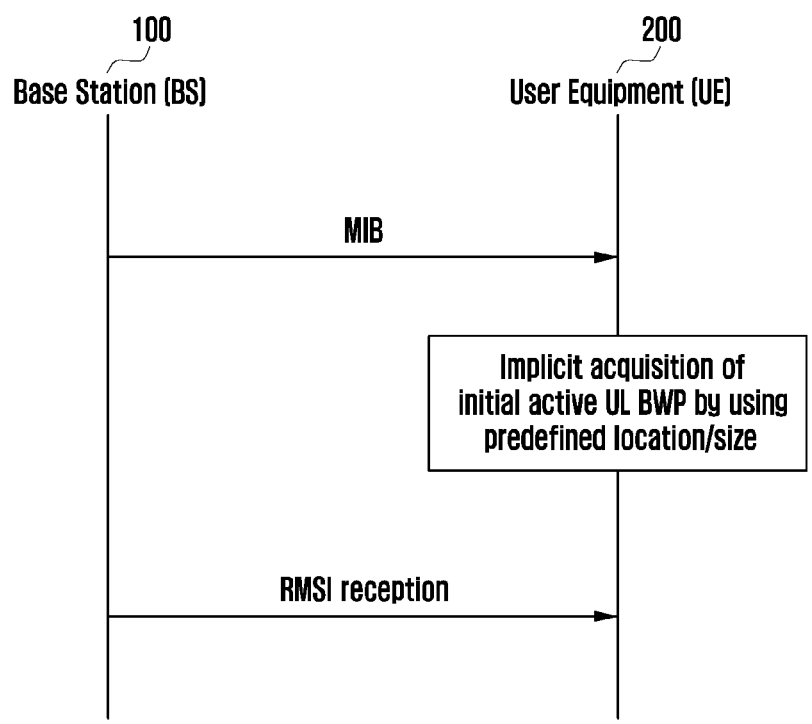
FIGS. 17A-17C illustrate sequence diagrams depicting the signaling message communicated between the BS and UE, according to an embodiment as disclosed herein.
Figure 17B:
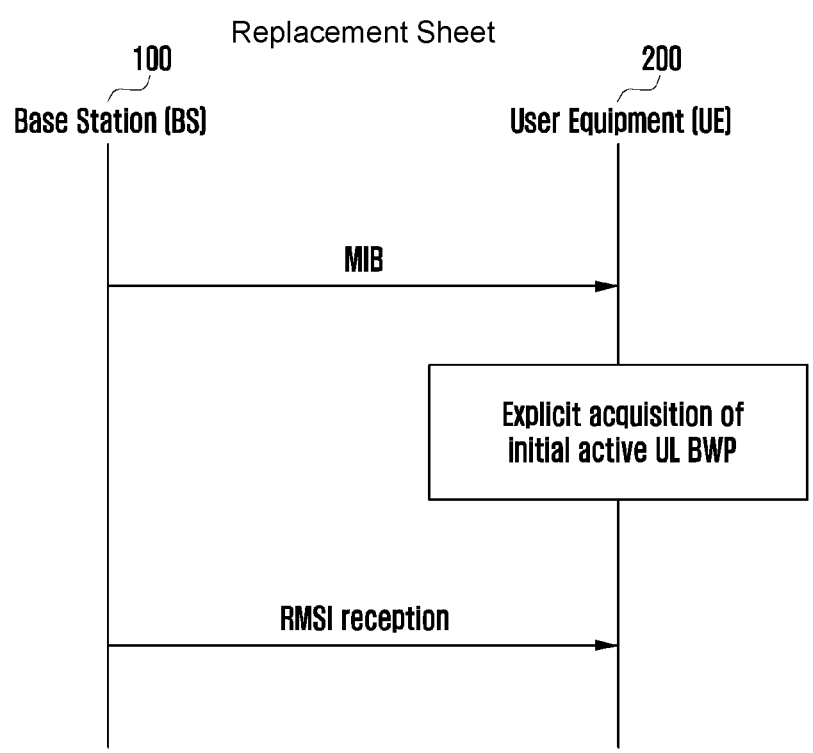
Figure 17C:
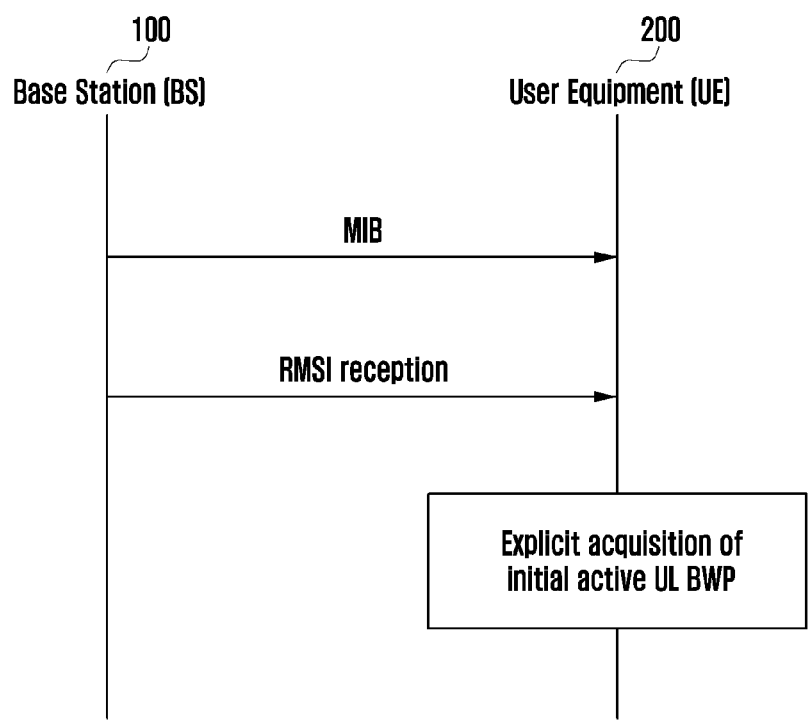

FIGS. 17A-17C illustrate sequence diagrams depicting the signaling message communicated between the BS and UE, according to an embodiment as disclosed herein. Similar to FIGS. 16A-16C, the BS 100 indicates the initial active UL BWP to the UE 200.

Figure 18A:
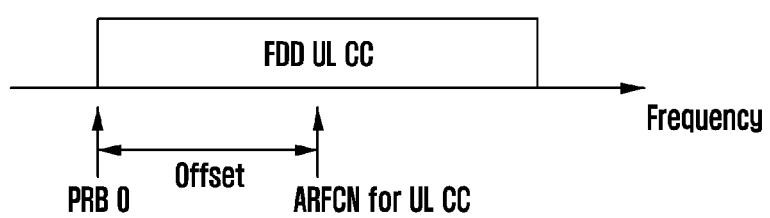
FIG. 18A is a schematic diagram illustrating UL PRB indication for a common PRB indexing, according to an embodiment as disclosed herein.
Figure 18B:
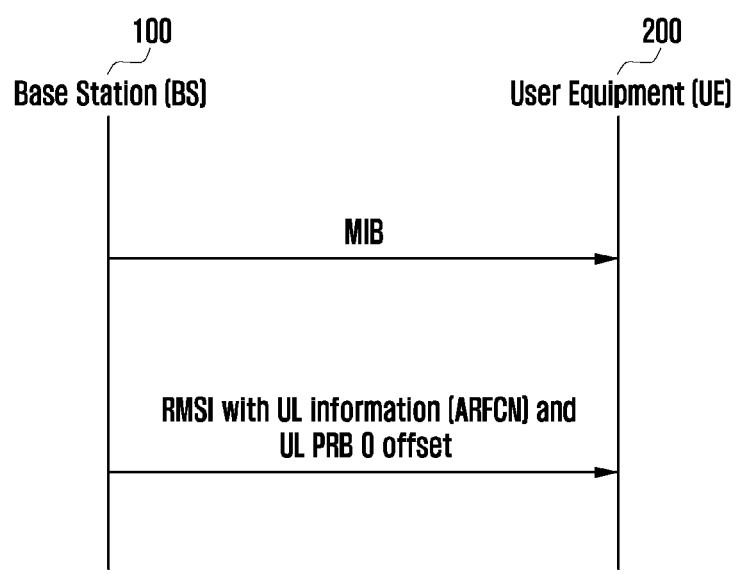
FIG. 18B and FIG. 18C illustrate sequence diagrams depicting the signaling message communicated between the BS and UE, according to an embodiment as disclosed herein.
Figure 18C:
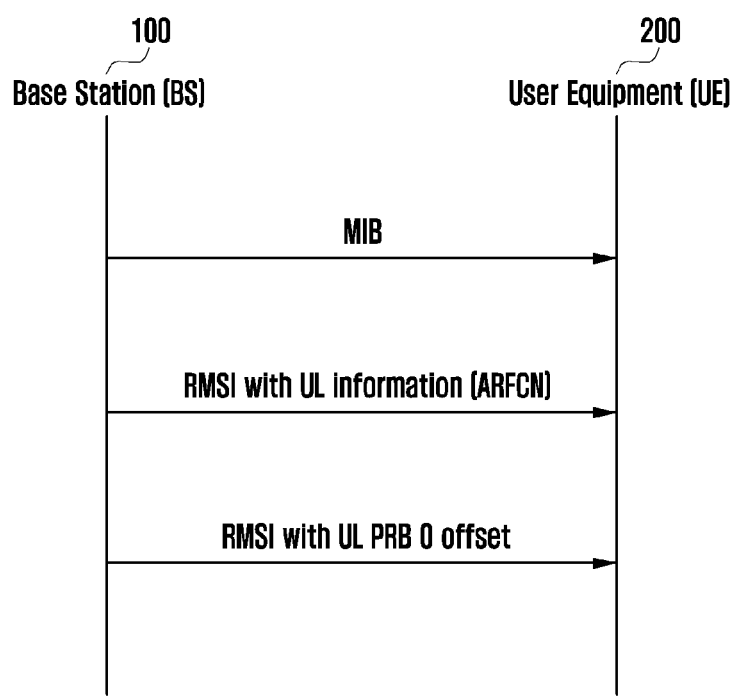

FIG. 18A is a schematic diagram illustrating UL PRB indication for the common PRB indexing, according to an embodiment as disclosed herein. The issue herein is to how to indicate reference point PRB 0 for FDD UL:
 A. Indicate an offset from UL ARFCN to PRB 0
 B. Opt 1) RMSI/Opt 2) RRC
 C. Size of UL CC may be indicated to UE 200 because of spectrum mask regulation FIG. 18B and FIG. 18C illustrate sequence diagrams depicting the signaling message communicated between the BS and UE, according to an embodiment as disclosed herein. As shown in the FIG. 18B and FIG. 18C, the BS 100 indicates RMSI with UL information (ARFCN) and UL PRB 0 offset to the UE 200 200.

Figure 19A:
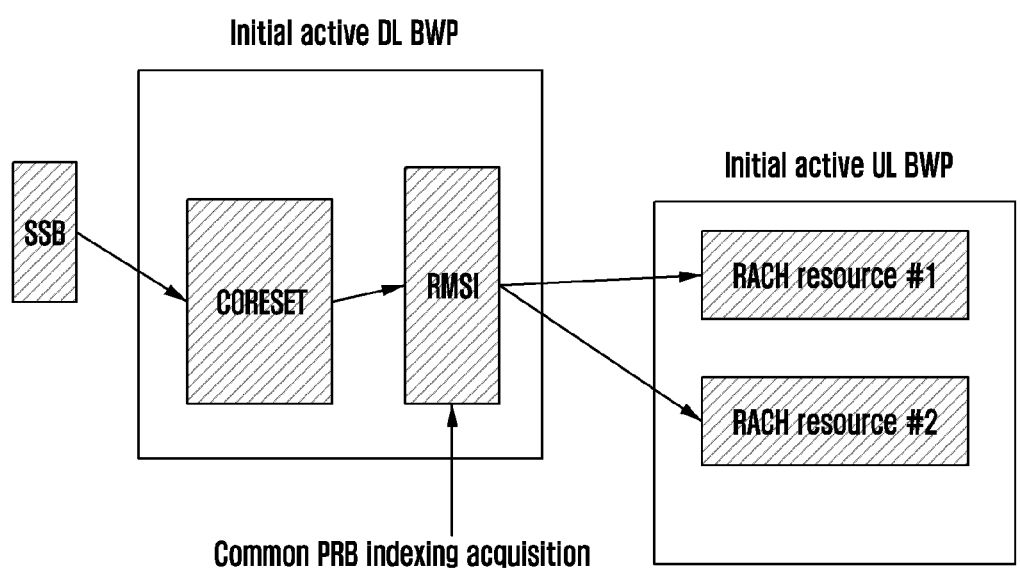
FIG. 19A and FIG. 19B illustrate the BWP configuration based on the common PRB indexing, according to an embodiment as disclosed herein.
Figure 19B:
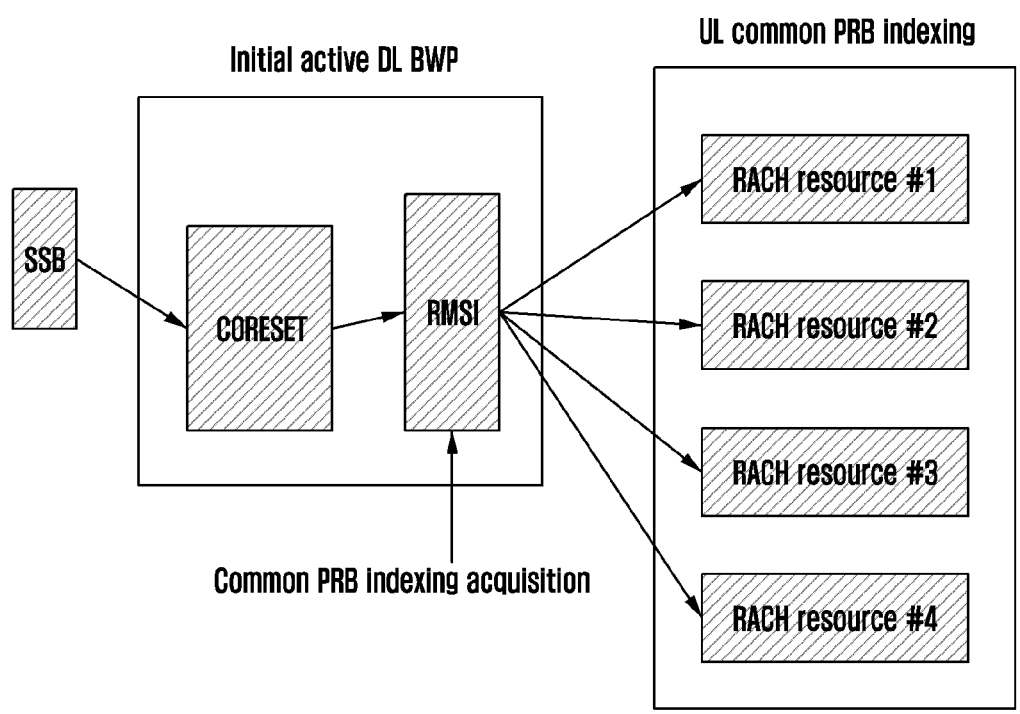

FIG. 19A and FIG. 19B illustrate the BWP configuration based on the common PRB indexing, according to an embodiment as disclosed herein.

As shown in the FIG. 19A, the BS indicates the BWP configuration based on the common PRB indexing is indicated to the UE 200 200.
 1. RMSI reception and random access operate based on initial active BWP
 2. RMSI reception is performed within initial active BWP, but multiple RACH resource can be signaled based on common PRB indexing for offloading
 3. RMSI reception and random access operate based on the indications provided via Solution 1 in the initial active BWP solutions i.e., no explicit indication for the UL and DL initial active BW.
 After RRC connection, the UE 200 200 can be configured a set of BWPs by using common PRB indexing.

1. The frequency locations of PRB0 of DL/UL are configured by RRC message:
 a. RMSI reception and random access operate based on initial active BWP;
 b. RMSI reception and random access operate based on the indications provided via Solution 1 in the initial active BWP solutions i.e., no explicit indication for the UL and DL initial active BWP.
 After RRC conn, UE 200 can be configured a set of BWPs by using common PRB indexing.

In another embodiment, for common PRB indexing for FDD UL, in order to indicate where PRB 0 is to UE, ARFCN for UL cell can be used. Instead of using the lowest SS block, since FDD UL doesn't have SS block, the gnb 100 can indicate an offset from ARFCN for UL cell to PRB 0 to UE. This offset information can be contained together in RMSI or indicated to UE 200 via RRC signaling at connection setup or in connected mode when this is needed. Then, UE 200 can generate UL common PRB indexing with both UL ARFCN and the offset information. Meanwhile, unlike DL, UE 200 may have to know right and left most PRB of UL to keep spectrum mask regulation for UL transmission. For the reason, the right most PRB information may be included in RMSI or via RRC (UE specific higher layer signaling) as well. For UL common PRB indexing, an offset from ARFCN for UL CC to PRB 0 should be indicated to UE 200 via RMSI.

FIGS. 20A-20D are schematic diagram illustrating a method for performing a Random Access channel (RACH) procedure using an initial active BWP configuration considering multiple SSBs, according to an embodiment as disclosed herein.

Figure 20A:
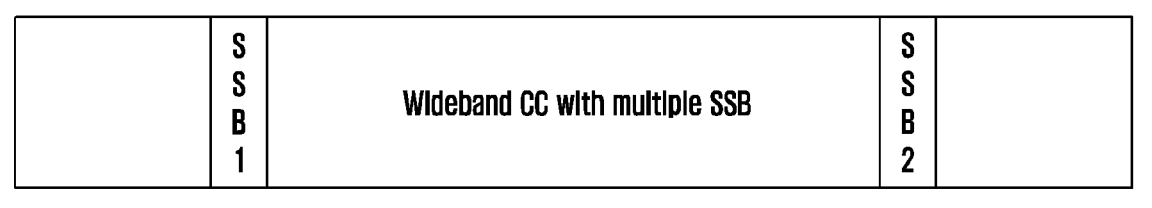

As shown in the FIG. 20A, the SSB1 and SSB2 indicate potential locations of the SS blocks inside the WB Carrier and each location can contain multiple physical SS blocks (0 to L-1) and timing index between them must be same, although physical beams may be different.

Figure 20B:
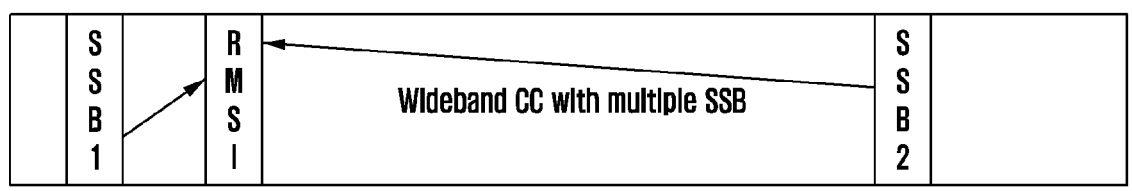
Figure 20C:
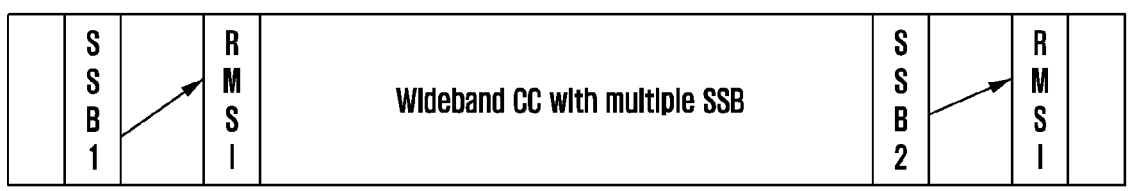
Figure 20D:
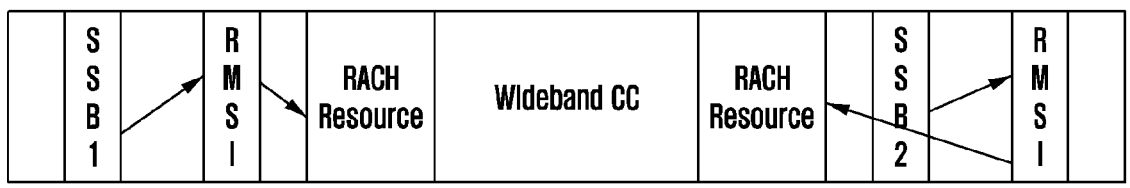

As shown in the FIG. 20B, a RMSI location for all SSB, having common information for all SSB are indicated:
 1. PBCH in each SSB location points to same RMSI
 2. So PBCH contents are different at different frequency location
 The proposed method needs retuning to support SSB at different edges.
 The common RMSI location can prevent the UE 200 from reading SSB at other frequency locations to get cell information for whole WB.
 The proposed method can support only if RMSI contents are not SSB location specific i.e., do not carry offset from SSB.
 NW resource saving due to avoiding too many RMSI locations.
 Prevents the gnb 100 flexibility for optimizations on the beam sweeping/patterns and using some QCL information across beams at different SSB locations.
 Too many bits in PBCH to indicate RMSI in some common location.
 Common RMSI indicates common RACH configuration
 1. Same resources used for supporting a large number of users for RACH in a wideband carrier
 2. May actually reduce the capacity of the WB system As shown in the FIG. 20C, a different RMSI location for each SSB, where the each SSB has its own RMSI.
 The UE 200 can support different cell-ID in case needed
 1. Same cell-Id but different ARFCN can also handle like multiple cells 2. Different cell-Id and same ARFCN (like wideband carrier center) can also be handled in RAN2 as different cell 3. Same cell-Id and same ARFCN=same wideband cell 4. Different cell-Id and different ARFCN=different cells a. For different cells, only frequency ranges are overlapping 5. Each user can be independently supported without much re-tuning and RMSI can be within UE 200 minimum BW around SSB can be easy behavior 6. Independent RMSI can support independent RACH configure a. Different RACH resources for each UE 200 reading different SSB 7. If there are several SSB locations inside WB, then the gnb 100 can make some compromise i.e., groups of SSB can be mapped to same RMSI a. To avoid too much RMSI overhead and too much RACH overhead 8. Initial active BWP will be defined per SSB location i.e., can be RMSI location defined per SSB As shown in the FIG. 20D where the UE 200 will handle RACH and initial operations based on multiple SSB and multiple RMSI etc.

Figure 21:
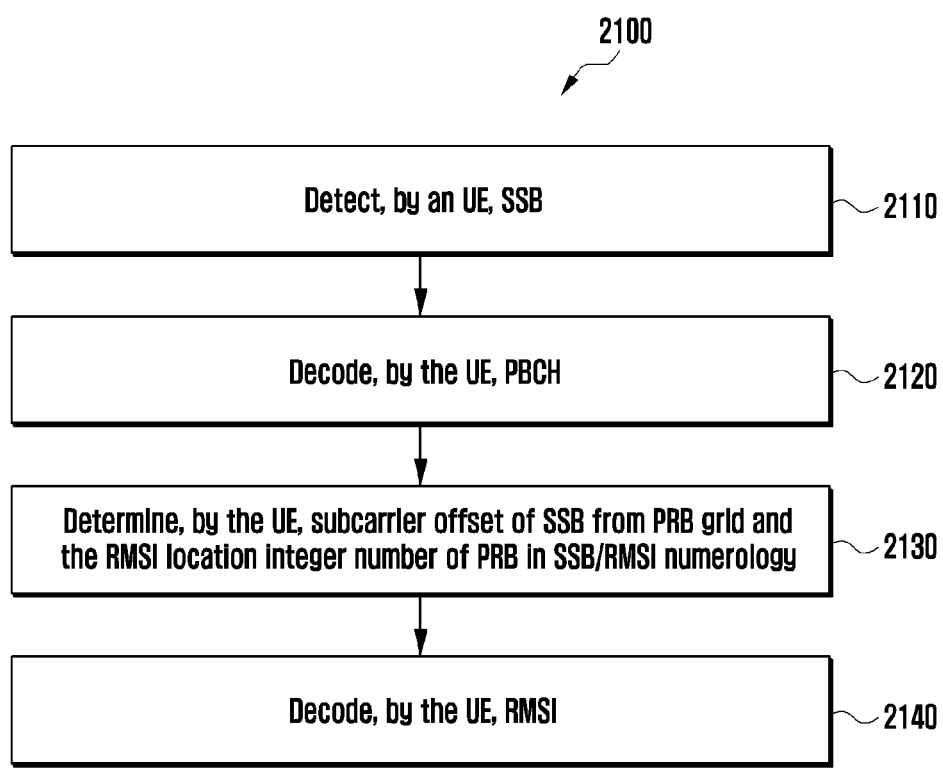
FIG. 21 is a flow diagram illustrating various operations performed by the UE based on the initial active BWP configuration, according to embodiments as disclosed herein.

FIG. 21 is a flow diagram 2100 illustrating various operations performed by the UE 200 based on the initial active BWP configuration, according to embodiments as disclosed herein.

At step 2110, the method includes detecting, by the UE 200, SSB. In an embodiment, the method allows the BWP configuration engine 221 to detect the SSB. At step 2120, the method includes decoding, by the UE 200, PBCH. In an embodiment, the method allows the BWP configuration engine 221 to decode the PBCH from the SSB.

At step 2130, the method includes determining, by the UE 200, subcarrier offset of SSB from PRB grid and the RMSI location integer number of PRB in SSB/RMSI numerology. In an embodiment, the method allows the BWP configuration engine 221 to determine the subcarrier offset of SSB from PRB grid and the RMSI location integer number of PRB in SSB/RMSI numerology. At step 2140, the method includes decoding, by the UE 200, RMSI. In an embodiment, the method allows the BWP configuration engine 221 to decode the RMSI.

The following behavior for a NR UE 200 can be performed, the behavior includes UE 200 receives the SSB, decodes PBCH and obtains information regarding the initial active BWP (RMSI location and the SSB offset from the PRB grid). The RMSI location is found using a) the SSB offset which is needed to align with the PRB grid and b) the RMSI location indicated via PBCH in terms of integer number of Pseudorandom Binary Sequence (PRBs). Depending on the supported UE 200 minimum BW, the UE 200 may or may not retune to receive RMSI (if the UE 200 minimum BW covers both SSB and RMSI, then no retuning is needed; else the UE 200 will retune from SSB BW to RMSI BW location).

In an embodiment, the integer number of PRBs indicated by the PBCH can be in terms of the numerology of a) SSB, b) RMSI numerology or c) some reference numerology for the accessed band which will be defined in specification. Otherwise, the location can be indicated as an offset in number of sub-carriers/exact frequency location.

The location of RMSI can be indicated as follows:

a) From lowest PRB index of SSB to lowest PRB index of RMSI, b) From highest PRB index of SSB to lowest PRB index of RMSI, c) From lowest PRB index of SSB to highest PRB index of RMSI, d) From center PRB index of SSB to RMSI BW lowest PRB index, e) From center PRB index of SSB to RMSI BW highest PRB index f) From center PRB index of SSB to RMSI BW center PRB index, g) From lowest PRB index of SSB to RMSI BW center PRB index, h) From highest PRB index of SSB to RMSI BW center PRB index, i) Fixed offset from SSB where the fixed offset is configured in specification and the number of fixed offsets are defined to fix number of bits in PBCH for RMSI scheduling, j) Exact number of sub-carriers are indicated between SS block (center sub-carrier) and RMSI (center sub-carrier), and k) Combinations of the above.

In an embodiment, the CORESET location inside this RMSI BW can be located at the any of the following:

a) Center of the RMSI BW, b) Edges of RMSI BW (lowest or the highest), c) Fixed offset from the RMSI BW center/lowest/highest, d) Indicated via PBCH, e) As in LTE system it is distributed in the entire RMSI BW.

The size of CORESET may be fixed in specification, or indicated via PBCH or implicitly derived from some parameters indicated via PBCH.

In an embodiment, in the post RRC connection, a UE 200 may be configured with a default BWP which the UE 200 may use for all connected mode operations. This default BWP may be UE 200 specifically configured to the UE 200 by the gNB 100 and enables the load balancing purposes for the gnb 100 (can also allow for connected mode paging in this BWP). This default BWP may or may not have an SS block (since this is purely for load balancing purposes and for fall back mode of operations), hence the UE 200 must be indicated to use the initial BWP for measurement purposes in case the UE 200 BW does not include a SSB i.e., for narrow band users retuning may be needed for measurement while for a wideband UE 200 the default BWP can be configured to include the SSB as well.

Measurements for RRM: For the case of neighbor cell measurements, it is typically beneficial for the UE 200 to assume the presence of SS blocks of the neighbor cell at the same location of serving cell to avoid retuning. However, with the presence of multiple SS blocks, presence of default SS block locations (cell defining SS block) in a wideband carrier per UE, it is necessary to define a fool proof mechanism for the measurements.

In general as in 3GPP standard, to make the UE 200 measurement behaviour clear, the UE 200 should be indicated with one specific SSB in the UE's serving cell which is used for measurement for mobility purpose in multiple SSBs scenario. Further, it is mentioned that "A measurement is defined as a SSB based intra-frequency measurement provided the centre frequency of the SSB of the serving cell indicated for measurement and the centre frequency of the SSB of the neighbour cell are the same, and the subcarrier spacing of the two SSBs are also the same." Else, it is defined as inter-frequency measurement when either the centre frequency or the SCS of the SSBs are different.

Based on these, the proposed method can be concluded that the cell-defining SSB can be used for mobility purposes. Furthermore, the proposed method can be concluded that a single SSB BW is used for measurement purposes. The proposed method must be mandated for the UE 200 to use one SSB BW for measurements. Which SSB the UE 200 uses can be a) Cell-defining SSB which the UE 200 found during initial access b) Default/anchor SSB configured to UE 200 in a UE 200 specific manner When CSI-RS is also present, the following combinations may be possible and must be further studied if they should be considered or not:

a) One SS block & one WB CSI-RS b) One SS block & multiple NB CSI-RS

SSB locations for WB carrier: From a network perspective, SSB can be located at any location on the SS frequency raster within the wideband CC. Also it is preferred that a UE 200 finds only one SSB within its BW during the course of initial cell selection to avoid any confusion about the SSB strength and location. Therefore, it is preferred that the SSB BW do not overlap in frequency. Hence in a wideband carrier, the number of SSB could depend on the network bandwidth and the UE 200 minimum BW. Further considering the FDM of RMSI and SSB, the SSB locations should be appropriately spaced apart.

In an embodiment, some of the SSB may be located off the SS-raster i.e., say in sub-carrier offset. These will not be found by UE 200 during normal mode of operation. Will be configured by network on-demand. This is used for additional measurement accuracy within a wideband carrier.

Quasi-colocation (QCL) Assumption across multiple SSB in frequency: The following options can be considered for the case of QCL across multiple SSB in frequency domain:

a) Alternative 1: No QCL across the SSBs;

b) Alternative 2: The same indexed SSBs across the frequency are assumed to be QCL'ed c) Alternative 3: UE 200 is configured the QCL relationship across multiple SSB in frequency domain via UE 200 specific signalling (irrespective of the indices of SSB)

d) Alternative 4: UE 200 is configured the QCL relationship across multiple SSB in frequency domain via RMSI (irrespective of the indices of SSB)

e) Alternative 5: QCL relationship only for SSBs in frequency sharing same cell Id f) Alternative 6: QCL relationship across SSBs in frequency irrespective of cell ID During RRC configuration of BWP, the UE 200 may be indicated the relationship between BWPs and the SSB. This helps UE 200 to understand which BWP can rely on which SSB for DL synch measurements. Same can be followed for the case of UL RACH and using of TA values.

SS block to RMSI Mapping: It is agreed that cell-defining SSB has an RMSI associated with it for all 5G systems. However, it is still under discussion as to whether this mapping is one-to-one or many-to-one. Many-to-one RMSI mapping can be considered in NR to reduce the network signaling overhead for RMSI.

In NR, the following RMSI-SSB mapping can be considered:

a) One SSB to one RMSI b) Many SSB to one RMSI c) Many SSB to Many RMSI i.e., subsets of SSB to subsets of RMSI The type of association is network implementation. However this can be done depending on how the SSB indices are designed by the gnb 100 and how they are behaving across the frequency locations and if they can share the same RMSI (PRACH configuration for example since UL should perform PRACH on same type of beams).

For case (b) and case (c), some more consideration is needed especially regarding common PRB indexing which is done on the entire wideband carrier. Options (b) and (c) should be supported form network side to reduce RMSI network overhead. Then RMSI must indicate PRACH configuration supported for multiple SSB in frequency. This indicates that the multiple SSB with same indices but in different frequency locations must be QCL'ed. Hence, only when such QCL is known to be possible from network implementation, the gnb 100 can decide to provide such many-to-one and many-to-many mapping between SSB and RMSI.

For common PRB indexing, since different UE 200 may find different cell-defining SSB, indication of the offset from PRB0 to the lowest PRB of the SSB accessed by the UE 200 via RMSI is not feasible. Since different SSB will need different offset indications for the purpose of indexing. This indexing may be useful for OSI, paging etc. Furthermore, UE 200 must explicitly indicate the SSB location to the gnb 100 during the RRC connection establishment procedure so that the gnb 100 can indicate the appropriate offset to the UE. Therefore, UE 200 specific signaling of the offset indication/SSB frequency location should be considered in NR. If RMSI indication is deemed necessary, the offset must be from PRB0 to the lowest PRB of the RMSI which is common across multiple SSBs must be supported. Thus common PRB indexing can be done in cases (b) and (c) as follows:

a) Indicate offset from PRB0 to used RMSI lowest PRB, b) Indicate offset from PRB0 to lowest PRB of SSB via UE 200 specific RRC, UE 200 also sends the SSB location, c) Only support 1 SSB to 1 RMSI and then PRB0 to lowest SSB index can be signaled via RMSI, d) Indicate offset from PRB0 to used RMSI center PRB, e) Indicate offset from PRB0 to used RMSI highest PRB, and f) Indicate offset from PRB0 to initial active BWP used by the user associated with the corresponding RMSI Common PRB indexing without SSB: For common PRB indexing for carrier without SSB such as FDD UL carrier and Scell without SSB, in order to indicate where PRB 0 is to UE, ARFCN for the carrier can be a good option for start position to indicate offset to PRB 0. If PRB grid is center-oriented and always aligned with center of carrier regardless of numerology, ARFCN is very appropriate to indicate offset to PRB 0 in terms of PRB level. This offset information can be additionally contained in system information for FDD UL or RRC reconfiguration message for Scell addition. On the contrary, if PRB grid is not aligned with ARFCN due to odd number of PRBs or other reasons, subcarrier spacing level offset should be added on PRB level offset similar to indication to resolve floating synch issue.

Lack of PRB numbers for common PRB indexing: According to bandwidth part related agreement in RAN1#90 meeting, common PRB index is for maximum number of PRBs for a given numerology defined in 3GPP standard. Since maximum number of PRBs is decided to 275 PRBs i.e., 3300 subcarriers, currently, considering different subcarrier spacing, bandwidth spanned by common PRB indexing will be different depending on which SCS is used. Therefore, as shown below figure, a UE 200 cannot be configure d a bandwidth part with lower subcarrier spacing, SCS 1 outside its common PRB indexing due to PRB number limitation. To resolve this issue, combinations of PRB indexing per numerology can be used. For example, PRB 300 with SCS 1 can be expressed as PRB 149 with SCS 0+PRB 0 with SCS 1. The information can be contained when bandwidth parts are configured to a UE via RRC signaling.

The embodiments disclosed herein can be implemented through at least one software program running on at least one hardware device and performing network management functions to control the elements. The elements shown in the FIGS. 1 through 21 include blocks which can be at least one of a hardware device, or a combination of hardware device and software module.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method of a user equipment (UE) in a wireless communication system, the method comprising:
   receiving, from a base station, a master information block (MIB) including initial downlink bandwidth part (BWP) configuration information;
   receiving, from the base station, remaining minimum system information (RMSI) including initial uplink BWP configuration information; and
   receiving, from the base station, a radio resource control (RRC) message including information on uplink BWP and information on downlink BWP,
   wherein the RMSI is received based on the initial downlink BWP configuration information, and
   wherein at least one uplink BWP and at least one downlink BWP are paired based on the information on uplink BWP and the information on downlink BWP.

2. The method of claim 1, wherein the paired uplink BWP and the downlink BWP are related to each other based on a center frequency.

3. The method of claim 1, wherein radio link monitoring (RLM) configuration information and information on quasi co-location (QCL) relationship between a first reference signal and a second reference signal for a BWP are received by the RRC message.

4. The method of claim 1, further comprising:
   receiving, from the base station, a first data based on a first BWP;
   receiving, from the base station, downlink control information (DCI) for changing an active BWP from the first BWP to a second BWP; and
   receiving, from the base station, a second data based on the second BWP,
   wherein the first data and the second data are combined.

5. A base station in a wireless communication system, the base station comprising:
   a transceiver; and
   a processor operably connected to the transceiver, the processor configured to:
      transmit, to a user equipment (UE), a master information block (MIB) including initial downlink bandwidth part (BWP) configuration information,
      transmit, to the UE remaining minimum system information (RMSI) including initial uplink BWP configuration information, and
      transmit, to the UE, radio resource control (RRC) message including information on uplink BWP and information on downlink BWP,
   wherein the RMSI is transmitted based on the initial downlink BWP configuration information, and
   wherein at least one uplink BWP and at least one downlink BWP are paired based on the information on uplink BWP and the information on downlink BWP.

6. The base station of claim 5, wherein the paired uplink BWP and the downlink BWP are related to each other based on a center frequency.

7. The base station of claim 5, wherein radio link monitoring (RLM) configuration information and information on quasi co-location (QCL) relationship between a first reference signal and a second reference signal for a BWP are transmitted by the RRC message.

8. A user equipment (UE) in a wireless communication system, the UE comprising:
   a transceiver; and
   a processor operably connected to the transceiver, the processor configured to:
      receive, from a base station, a master information block (MIB) including initial downlink bandwidth part (BWP) configuration information,
      receive, from the base station, remaining minimum system information (RMSI) including initial uplink BWP configuration information, and
      receive, from the base station, radio resource control (RRC) message including information on uplink BWP and information on downlink BWP,
   wherein the RMSI is received based on the initial downlink BWP configuration information, and
   wherein at least one uplink BWP and at least one downlink BWP are paired based on the information on uplink BWP and the information on downlink BWP.

9. The UE of claim 8, wherein the paired uplink BWP and the downlink BWP are related to each other based on a center frequency.

10. The UE of claim 8, wherein radio link monitoring (RLM) configuration information and information on quasi co-location (QCL) relationship between a first reference signal and a second reference signal for a BWP are received by the RRC message.

11. The UE of claim 8, wherein the processor is further configured to:
   receive, from the base station, a first data based on a first BWP,
   receive, from the base station, downlink control information (DCI) for changing an active BWP from the first BWP to a second BWP, and
   receive, from the base station, a second data based on the second BWP,
   wherein the first data and the second data are combined.

* * * * *